(12) United States Patent
Namiki et al.

(10) Patent No.: US 10,348,507 B2
(45) Date of Patent: Jul. 9, 2019

(54) DATA PROCESSING SYSTEM, DATA PROCESSING APPARATUS, AND DATA PROCESSING METHOD

(71) Applicants: Hitoshi Namiki, Kanagawa (JP); Hiroshi Kobayashi, Kanagawa (JP); Ryouji Yamamoto, Kanagawa (JP); Eiichiro Yoshida, Kanagawa (JP); Masuyoshi Yachida, Kanagawa (JP); Yuki Takaya, Kanagawa (JP)

(72) Inventors: Hitoshi Namiki, Kanagawa (JP); Hiroshi Kobayashi, Kanagawa (JP); Ryouji Yamamoto, Kanagawa (JP); Eiichiro Yoshida, Kanagawa (JP); Masuyoshi Yachida, Kanagawa (JP); Yuki Takaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 298 days.

(21) Appl. No.: 15/433,112

(22) Filed: Feb. 15, 2017

(65) Prior Publication Data

US 2017/0264441 A1   Sep. 14, 2017

(30) Foreign Application Priority Data

Mar. 14, 2016  (JP) .................................. 2016-049490
Jul. 29, 2016  (JP) .................................. 2016-150755

(51) Int. Cl.
    *G06F 21/44*   (2013.01)
    *H04L 29/06*   (2006.01)
    (Continued)

(52) U.S. Cl.
    CPC ............ *H04L 9/3247* (2013.01); *H04L 9/085* (2013.01)

(58) Field of Classification Search
    CPC .......... H04L 63/08; G06F 21/44; G06F 21/31
    See application file for complete search history.

(56) References Cited

U.S. PATENT DOCUMENTS

| 2006/0117183 A1* | 6/2006 | Hatano | G06F 21/64 |
| | | | 713/176 |
| 2008/0232596 A1* | 9/2008 | Matsukawa | H04L 9/085 |
| | | | 380/277 |
| 2013/0156257 A1* | 6/2013 | Anan | H04L 9/3247 |
| | | | 382/100 |

FOREIGN PATENT DOCUMENTS

| JP | 2006-261997 | 9/2006 |
| JP | 2008-234597 | 10/2008 |

(Continued)

*Primary Examiner* — Izunna Okeke
(74) *Attorney, Agent, or Firm* — IPUSA, PLLC

(57) ABSTRACT

A data processing apparatus includes a memory storing a program and a processor configured to execute the program to implement a process of reading signed data including a predetermined number (n) of secret sharing data sets generated for each section of time series data and a signature value calculated for the each section of time series data based on a secret sharing protocol. The n secret sharing data sets include n units of data acquired from each section of time series data and parameter information for a polynomial of a predetermined degree calculated based on the acquired n units of data. The processor further implements processes of acquiring the predetermined degree, and editing the signed data by extracting a specific number of the secret sharing data sets from the n secret sharing data sets for the each section of time series data according to the acquired predetermined degree.

7 Claims, 32 Drawing Sheets

(51) Int. Cl.
 *H04L 9/32* (2006.01)
 *H04L 9/08* (2006.01)

(56) References Cited

FOREIGN PATENT DOCUMENTS

JP    2013-126189    6/2013
JP    2015-088855    5/2015

* cited by examiner

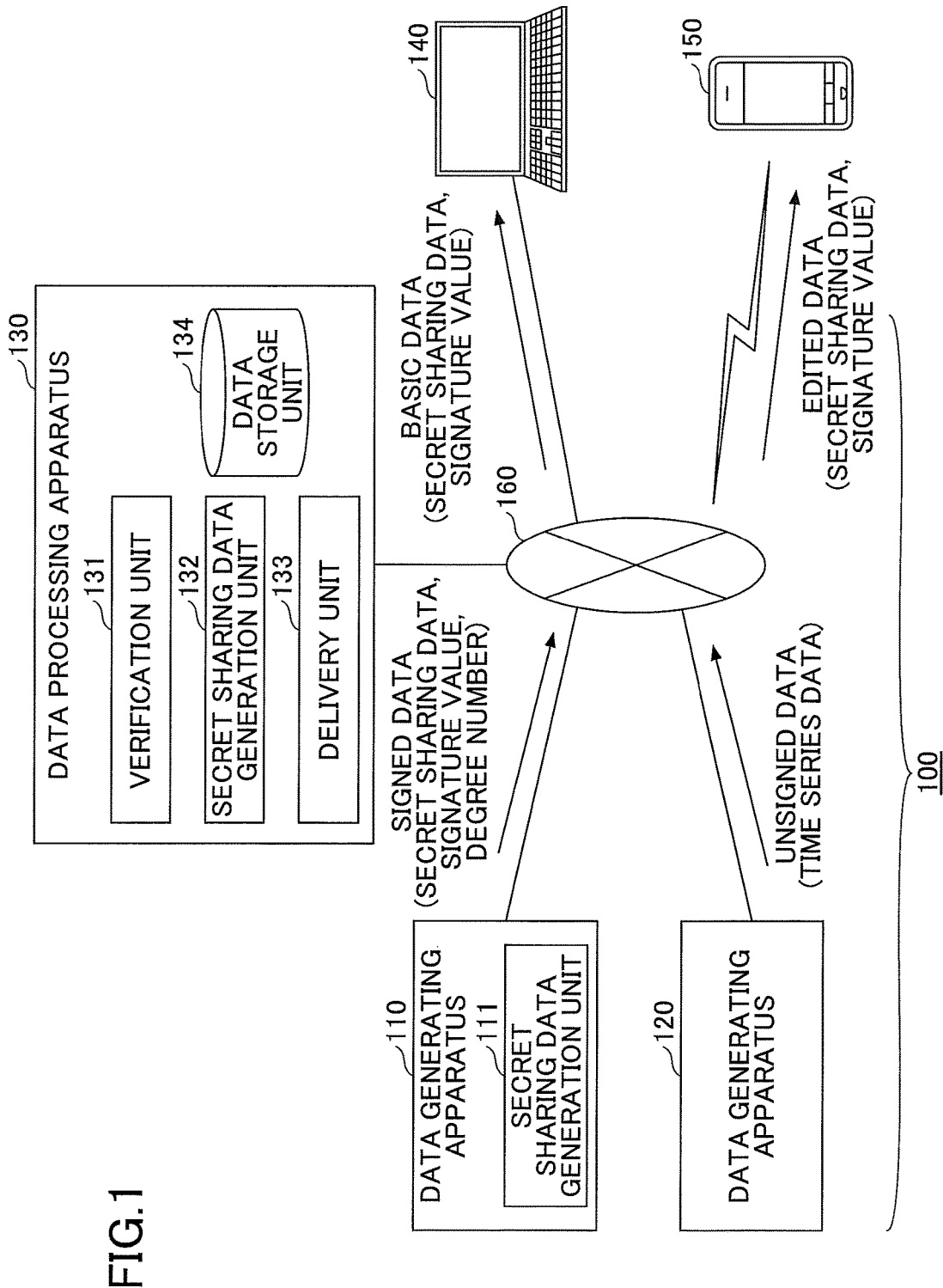

FIG.9A

| SIGNED DATA | SIGNATURE VERIFICATION RESULT | BASIC DATA | EDITED DATA |
|---|---|---|---|
| S-Data001 (SECRET SHARING DATA, DEGREE NUMBER, SIGNATURE VALUE) | SUCCESS | S-Data001H (SECRET SHARING DATA, SIGNATURE VALUE) | S-Data001L (SECRET SHARING DATA, SIGNATURE VALUE) |
| S-Data002 (SECRET SHARING DATA, DEGREE NUMBER, SIGNATURE VALUE) | SUCCESS | S-Data002H (SECRET SHARING DATA, SIGNATURE VALUE) | S-Data002L (SECRET SHARING DATA, SIGNATURE VALUE) |
| S-Data003 (SECRET SHARING DATA, DEGREE NUMBER, SIGNATURE VALUE) | FAILURE | | |
| ... | ... | ... | ... |

| UNSIGNED DATA | SIGNED DATA | BASIC DATA | EDITED DATA |
|---|---|---|---|
| Data101 | S-Data101<br>(SECRET SHARING DATA,<br>DEGREE NUMBER,<br>SIGNATURE VALUE) | S-Data101H<br>(SECRET SHARING DATA,<br>SIGNATURE VALUE) | S-Data101L<br>(SECRET SHARING DATA,<br>SIGNATURE VALUE) |
| Data102 | S-Data102<br>(SECRET SHARING DATA,<br>DEGREE NUMBER,<br>SIGNATURE VALUE) | S-Data102H<br>(SECRET SHARING DATA,<br>SIGNATURE VALUE) | S-Data102L<br>(SECRET SHARING DATA,<br>SIGNATURE VALUE) |
| Data103 | S-Data103<br>(SECRET SHARING DATA,<br>DEGREE NUMBER,<br>SIGNATURE VALUE) | S-Data103H<br>(SECRET SHARING DATA,<br>SIGNATURE VALUE) | S-Data103L<br>(SECRET SHARING DATA,<br>SIGNATURE VALUE) |
| ... | ... | ... | ... |

920

DATA PROCESSING SYSTEM, DATA PROCESSING APPARATUS, AND DATA PROCESSING METHOD

CROSS-REFERENCE TO RELATED APPLICATIONS

The present application claims priority under 35 U.S.C. § 119 to Japanese Patent Application No. 2016-049490 filed on Mar. 14, 2016 and Japanese Patent Application No. 2016-150755 filed on Jul. 29, 2016, the entire contents of which are incorporated herein by reference.

BACKGROUND OF THE INVENTION

1. Field of the Invention

The present disclosure relates to a data processing system, a data processing apparatus, and a data processing method.

2. Description of the Related Art

Data distribution systems are known that provide delivery services of delivering time series data such as moving image data to terminals. In such systems, a data processing apparatus may be configured to edit data (e.g., change frame rate) based on specific requirements of a terminal corresponding to a delivery destination (e.g., processing capability of terminal) when delivering the data so that the terminal receiving the data may be able to continuously reproduce the data, for example.

SUMMARY OF THE INVENTION

According to one embodiment of the present invention, a data processing apparatus is provided that includes a memory storing a program and a processor configured to execute the program to implement a process of reading signed data including a predetermined number n (where n is an integer greater than or equal to 2) of secret sharing data sets generated for each section of time series data and a signature value calculated for the each section of time series data based on a secret sharing protocol. The n secret sharing data sets include n units of data acquired from the each section of time series data and parameter information for a polynomial of a predetermined degree calculated based on the acquired n units of data. The processor further implements processes of acquiring the predetermined degree, and editing the signed data by extracting a specific number of the secret sharing data sets from the n secret sharing data sets for the each section of time series data according to the acquired predetermined degree.

BRIEF DESCRIPTION OF THE DRAWINGS

FIG. 1 is a diagram illustrating an example configuration of a data distribution system according to a first embodiment of the present invention;

FIGS. 9A and 9B are tables illustrating example configurations of data stored in a data storage unit;

DESCRIPTION OF THE EMBODIMENTS

Figure 2A:
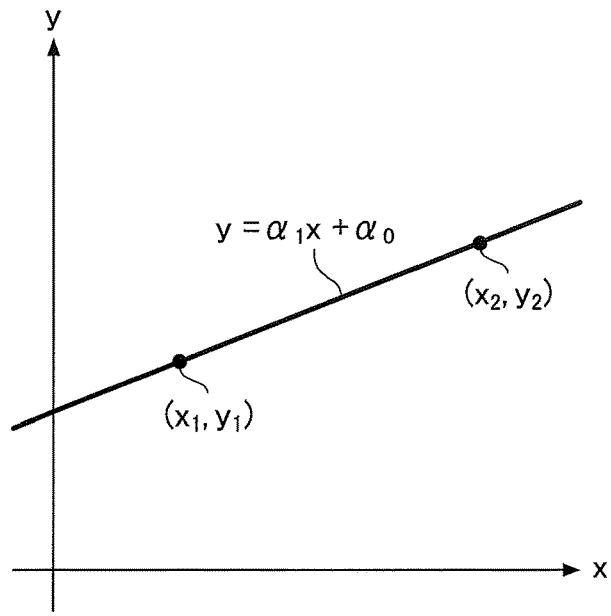
FIGS. 2A and 2B are diagrams describing examples of secret sharing protocols.

Data to be delivered by a data distribution system may include signed data having a signature attached thereto for ensuring authenticity of the data, for example. In such a case, when a data processing apparatus edits the signed data, the authenticity of the data may no longer be ensured. Thus, the data distribution system may have to deliver such signed data without having the data processing apparatus edit the data. That is, a delivery service of delivering data based on the specific requirements of a delivery destination may not be readily provided with respect to signed data that includes a signature.

Thus, an aspect of the present invention is directed to providing a technique for ensuring the authenticity of signed data including a signature even when data editing is performed on the signed data.

In the following, embodiments of the present invention are described with reference to the accompanying drawings. Note that in the drawings and the descriptions below, elements having substantially the same features and/or functions are given the same reference numerals and overlapping descriptions thereof may be omitted.

First Embodiment

1. Data Distribution System Configuration

In the following, the overall configuration of a data distribution system 100 including a data processing apparatus 130 according to a first embodiment of the present invention is described. FIG. 1 is a diagram illustrating an example configuration of the data distribution system 100.

In FIG. 1, the data distribution system 100 includes a data generating apparatus 110, a data generating apparatus 120, and a data processing apparatus 130. In the first embodiment, the data generating apparatus 110, the data generating apparatus 120, and the data processing apparatus 130 are communicably connected via a network 160. Also, a terminal 140 and a mobile terminal 150 can be connected to the data processing apparatus 130 via the network 160.

The data generating apparatus 110 is an apparatus (e.g., imaging apparatus) that generates time series data (e.g., moving image data). A secret sharing data generation program is installed in the data generating apparatus 110, and the data generating apparatus 110 functions as a secret sharing data generation unit 111 by executing the secret sharing data generation program.

The secret sharing data generation unit 111 generates secret sharing data by associating parameter information based on a secret sharing protocol with time series data that has been generated, and transmits the generated secret sharing data to the data processing apparatus 130. Also, the secret sharing data generation unit 111 generates a signature value by adding a signature to secret information that is used by the data processing apparatus 130 upon performing signature verification on secret sharing data, and transmits the signature value to the data processing apparatus 130. Further, the secret sharing data generation unit 111 transmits a degree number associated with the degree of a polynomial used to generate the secret sharing data to the data processing apparatus 130. Note that in the following descriptions, data including the secret sharing data, the signature value, and the degree number that are associated with each other to be transmitted by the data generating apparatus 110 is referred to as "signed data".

The data generating apparatus 120 is an apparatus (e.g., imaging apparatus) that generates time series data (e.g., moving image data). The data generating apparatus 120 transmits the generated time series data to the data processing apparatus 130. In the following descriptions, time series data transmitted by the data generating apparatus 120 is referred to as "unsigned data".

The data processing apparatus 130 processes various data transmitted from the data generating apparatus 110 and the data generating apparatus 120. A verification program, a secret sharing data generation program, and a delivery program are installed in the data processing apparatus 130, and by executing these programs, the data processing apparatus 130 implements functions of a verification unit 131, a secret sharing data generation unit 132, and a delivery unit 133.

The verification unit 131 receives the signed data transmitted from the data generating apparatus 110 or the unsigned data transmitted from the data generating apparatus 120, and stores the received data in a data storage unit 134. Also, the verification unit 131 performs signature verification on the secret sharing data included in the signed data stored in the data storage unit 134. The verification unit 131 performs such signature verification on the secret sharing data in order to enable delivery of signed data that has been successfully verified (signed data that has been authenticated).

The secret sharing data generation unit 132 generates signed data for unsigned data (time series data) that has been transmitted from the data generating apparatus 120 and stored in the data storage unit 134. The secret sharing data generation unit 132 then stores the generated signed data in association with the unsigned data in the data storage unit 134. The secret sharing data generation unit 132 of the data processing apparatus 130 has the same function as the secret sharing data generation unit 111 of the data generating apparatus 110. By providing the secret sharing data generating unit 132 in the data processing apparatus 130, the data processing apparatus 130 may be able to deliver signed data.

The delivery unit 133 generates "basic data" and "edited data" for each section of signed data stored in the data storage unit 134. The basic data is an example of first data corresponding to data (including secret sharing data and a signature value) that is to be delivered to the terminal 140 in response to a delivery request from the terminal 140. The edited data is an example of second data corresponding to data (including secret sharing data and a signature value) to be delivered to the mobile terminal 150 in response to a delivery request from the mobile terminal 150. Note that in the present embodiment, it is assumed that the secret sharing data included in the edited data is reduced in data size as compared with the secret sharing data included in the basic data.

The delivery unit 133 reads the signed data stored in the data storage unit 134 and generates basic data using the secret sharing data and the signature value included in the signed data. Also, the delivery unit 133 reads the signed data stored in the data storage unit 134 and generates edited data by deleting a portion of the secret sharing data and extracting the remaining portion of the secret sharing data according to the degree of the polynomial used to generate the secret sharing data.

Also, upon receiving a delivery request from the terminal 140 or the mobile terminal 150, the delivery unit 133 determines the delivery destination, selects either the basic data or the edited data as data to be delivered based on the determined delivery destination, and delivers the selected data to the delivery destination.

Note that the delivery unit 133 is able to edit the secret sharing data as described above because the secret sharing data generated based on a secret sharing protocol has the characteristics of being highly resistant to data loss in signature verification. In other words, secret sharing data generated based on a secret sharing protocol is able to ensure authenticity of data even when the secret sharing data is edited by deleting a portion of the secret sharing data and extracting the remaining portion thereof.

2. Secret Sharing Protocol

In the following, secret sharing protocols used for generating secret sharing data with high resistance to data loss in signature verification are briefly described with reference to FIGS. 2A-3C. FIGS. 2A-3C are diagrams describing examples of secret sharing protocols.

(1) Overview

Figure 2B:
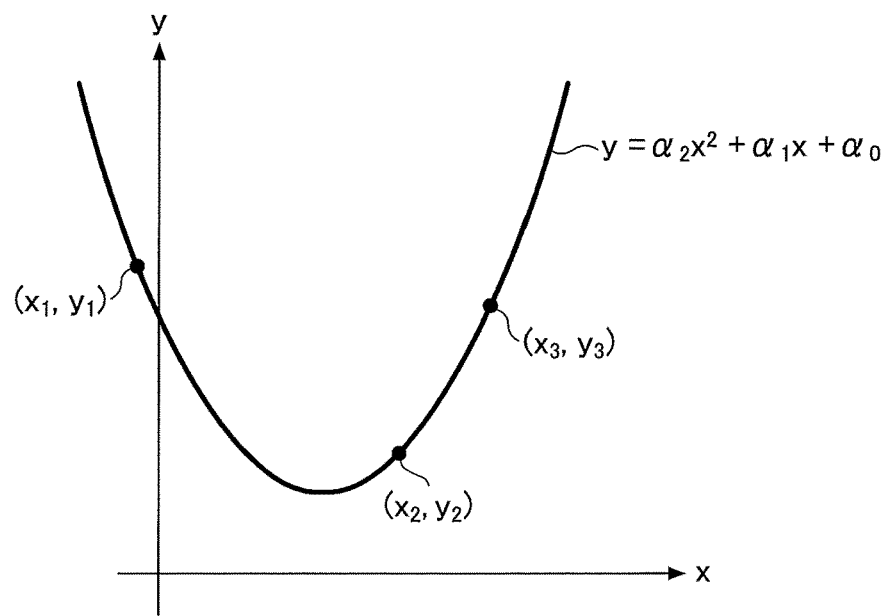

In general, a polynomial of degree (k−1) can be uniquely defined if there are k independent solutions, but a polynomial of degree (k−1) cannot be uniquely defined with (k−1) or less solutions. FIG. 2A illustrates an example case where a linear polynomial ($y=\alpha_1 x+\alpha_0$) is uniquely defined based on two independent solutions (($x_1$, $y_1$) and ($x_2$, $y_2$)). FIG. 2B illustrates an example case where a quadratic polynomial ($y=\alpha_2 x^2+\alpha_1 x+\alpha_0$) is uniquely defined based on three independent solutions (($x_1$, $y_1$), ($x_2$, $y_2$), ($x_3$, $y_3$)).

Figure 3A:
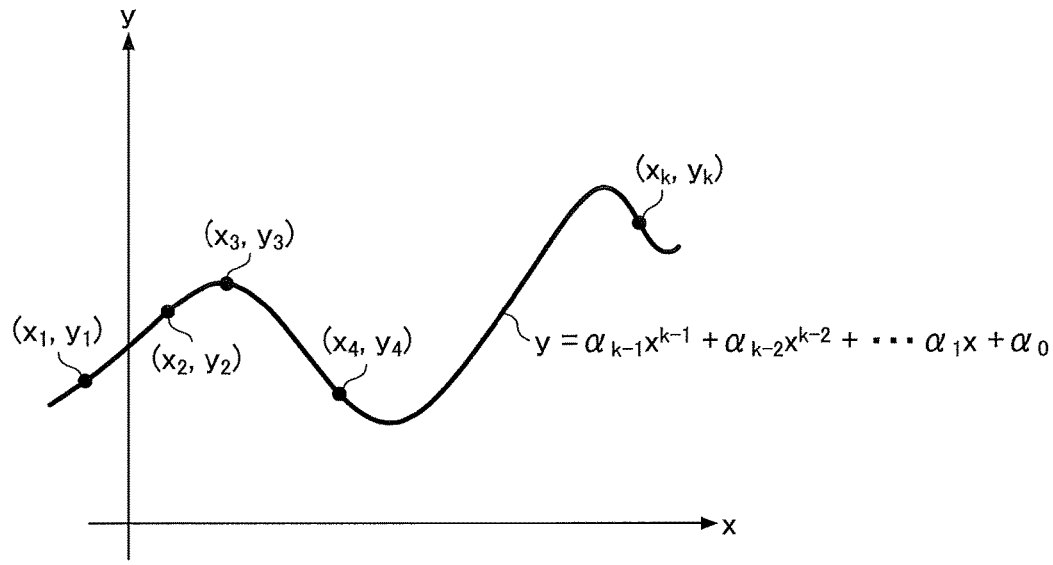
FIGS. 3A-3C are diagrams describing example applications of secret sharing protocols.

FIG. 3A illustrates an example case where a polynomial of degree (k−1) ($y=\alpha_{k-1}x^{k-1}+\alpha_{k-2}x^{k-2}+\ldots\alpha_1 x+\alpha_0$) is uniquely defined based on k independent solutions (($x_1$, $y_1$), ($x_2$, $y_2$), ... ($x_k$, $y_k$)).

Figure 3B:
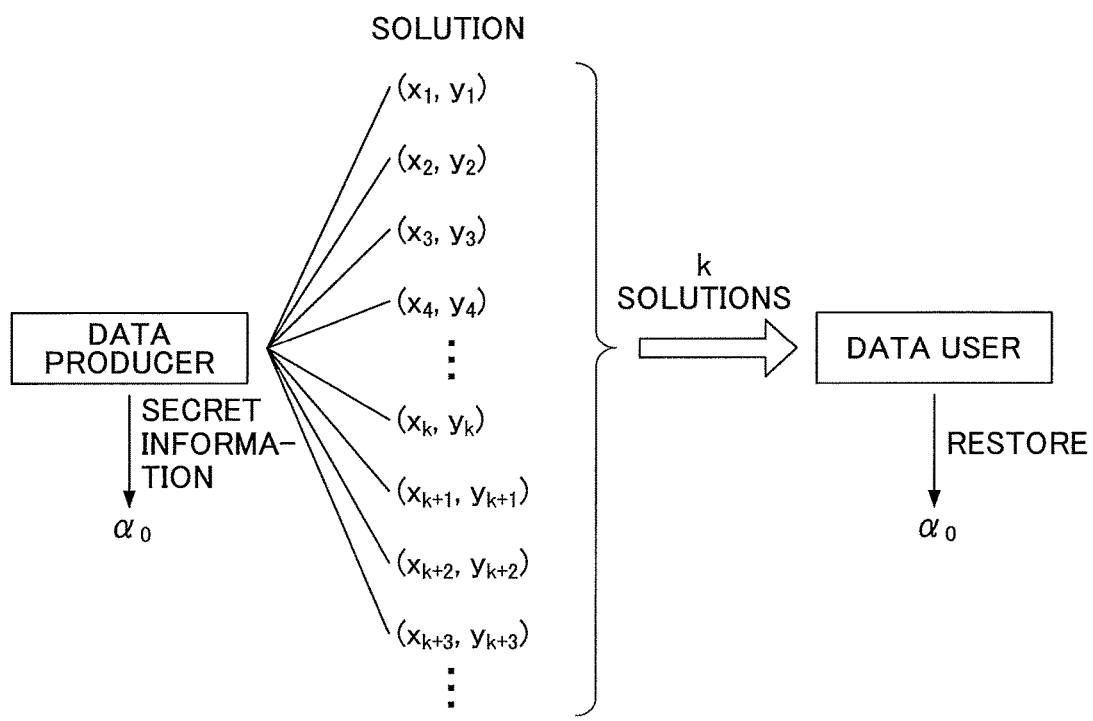

A secret sharing protocol makes use of such a relationship between a polynomial and its solution. As illustrated in FIG. 3B, when using a secret sharing protocol to generate secret sharing data, a data producer that generates secret information embeds the generated secret information in the term ($\alpha_0$) of the 0th degree of a polynomial of degree (k−1), generates a plurality of solutions of the polynomial of degree (k−1), and retains each solution separately. In this way, even when some solutions from among the plurality of solutions are leaked, the secret information ($\alpha_0$) may be prevented from being restored. That is, the secret information ($\alpha_0$) generated based on the secret sharing protocol has the characteristics of being highly resistant to leakage of solutions (secret sharing data).

Also, as illustrated in FIG. 3B, when using a secret sharing protocol, a data user may be able to restore the secret information ($\alpha_0$) by obtaining k solutions out of the plurality of solutions from the data producer. That is, the polynomial of degree (k−1) can be uniquely defined based on k solutions. In other words, the secret information generated based on the secret sharing protocol also has the characteristics of being highly resistant to loss of solutions (secret sharing data).

The secret sharing data generation units 111 and 132 according to the first embodiment take advantage of the above characteristics relating to high resistance to loss of solutions (secret sharing data) of the secret sharing protocol and applies the secret sharing protocol to time series data to obtain secret sharing data and generate signed data.

(2) Application of Secret Sharing Protocol to Time Series Data

The secret sharing data generating units 111 and 132 of the data generating apparatus 110 and the data processing apparatus 130 of the first embodiment generate secret sharing data by applying a secret sharing protocol to time series data and generate signed data that can be edited. Such a data generation process is specifically described below with reference to FIG. 3C.

First, the secret sharing data generating units 111 and 132 acquire n sets of unit data (where n is an integer greater than or equal to 2) from time series data. Note that in the present descriptions, "unit data" refers to data of a predetermined unit acquired from time series data. For example, when the time series data corresponds to moving image data, each predetermined frame may correspond to data of a predetermined unit. Alternatively, one region of a plurality of regions included in each frame may correspond to data of a predetermined unit, for example. Also, in a case where time series data includes moving image data and audio data, each frame and a section of audio data corresponding to the frame may correspond to data of a predetermined unit, for example. In the following descriptions, each unit data of the n sets of unit data is denoted as "$D_i$," where "i" corresponds to an integer between 1 and n (see left side of FIG. 3C).

Then, the secret sharing data generation units 111 and 132 generate n solutions of a polynomial of degree (k−1) based on the n sets of unit data ($D_i$). At this time, random numbers are used for the k parameters ($\alpha_{k-1}$, $\alpha_{k-2}$, ... $\alpha_0$) of the polynomial of degree (k−1) (where k is an integer greater than or equal to 1 and less than n). In the present embodiment, a hash value is used to substitute n sets of unit data ($D_i$) for variable x. Then, n values are calculated by substituting Hash($D_i$) for variable y, and each of these values is represented as parameter information "$W_i$" (where i is an integer between 1 and n). The parameter information "$W_i$" can be calculated based on the following Formula 1.

$$W_i=\Sigma_{(r=0-k-1)}\alpha_r\times\text{Hash}(D_i)^r \quad \text{(Formula 1)}$$

In this way, the secret sharing data generation units 111 and 132 calculate n solutions ($D_i$, $W_i$) of the polynomial of degree (k−1) ($y=\alpha_{k-1}x^{k-1}+\alpha_{k-2}x^{k-2}+\ldots\alpha_1 x+\alpha_0$) based on the n sets of unit data. In the present embodiment, secret sharing data corresponds to a combination of unit data and corresponding parameter information associated with the unit data.

Also, the secret sharing data generation units 111 and 132 use the parameter ($\alpha_0$) of the polynomial of degree (k−1) as secret information for ensuring authenticity of the secret sharing data and calculates a signature value (S) by adding a signature to the secret information. The secret sharing data generation units 111 and 132 calculate the signature value (S) by adding a signature to the secret information ($\alpha_0$) using a sign algorithm expressed by the following Formula 2.

$$S=\text{Sign}(\alpha_0, sk_{cam}) \quad \text{(Formula 2)}$$

In the above Formula 2, "$sk_{cam}$" denotes a signature key generated by the secret sharing data generation unit 111. In the case where the secret sharing data generation unit 132 generates the signature key, "$sk_{serv}$" may be used to denote the signature key, for example.

Figure 3C:
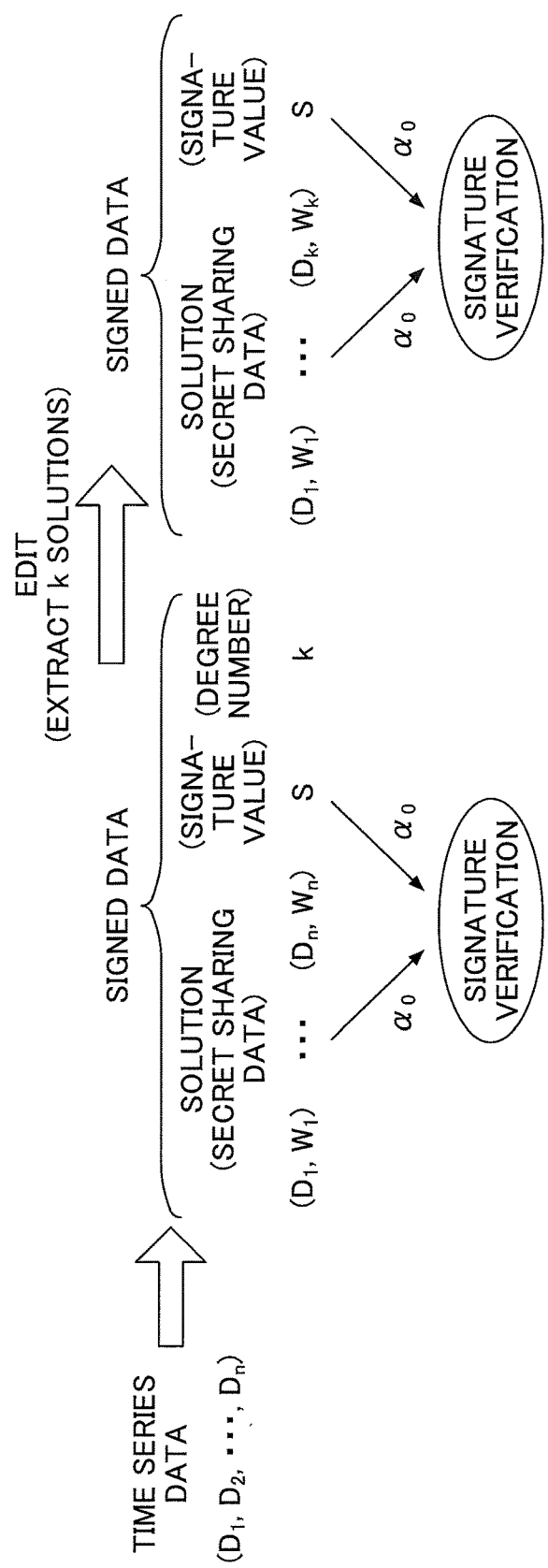

By associating the secret sharing data generated in the above-described manner with the corresponding signature value (S), a given apparatus that has received the secret sharing data can confirm the authenticity of the secret sharing data using the signature value (S) (see center of FIG. 3C).

Specifically, a parameter ($\alpha_0$) calculated based on k sets of secret sharing data out of the n sets of secret sharing data is compared with secret information ($\alpha_0$) calculated based on the signature value (S). If the two match, the authenticity of the secret sharing data can be ensured.

Then, the secret sharing data generation units 111 and 132 generate signed data including the secret sharing data, the signature value (S), and the degree number (k) associated with the polynomial used for calculating the parameter information ($W_i$).

The signed data generated in this manner by the secret sharing data generating units 111 and 132 can be verified through signature verification if k sets of secret sharing data are available at the time of signature verification. Therefore, for example, even when the data processing apparatus 130 that has acquired signed data performs an editing process of extracting k sets of secret sharing data but deleting the rest of the secret sharing data, the edited signed data may still be able to ensure data authenticity.

Note that signature verification may be performed on the edited signed data in a manner similar to the signature verification performed on the signed data that has not been edited. That is, secret information ($\alpha_0$) calculated based on k sets of secret sharing data may be compared with secret information ($\alpha_0$) calculated based on the signature value (S) to verify the edited signed data (see right side of FIG. 3C).

3. Data Distribution System Hardware Configuration

Figure 4A:
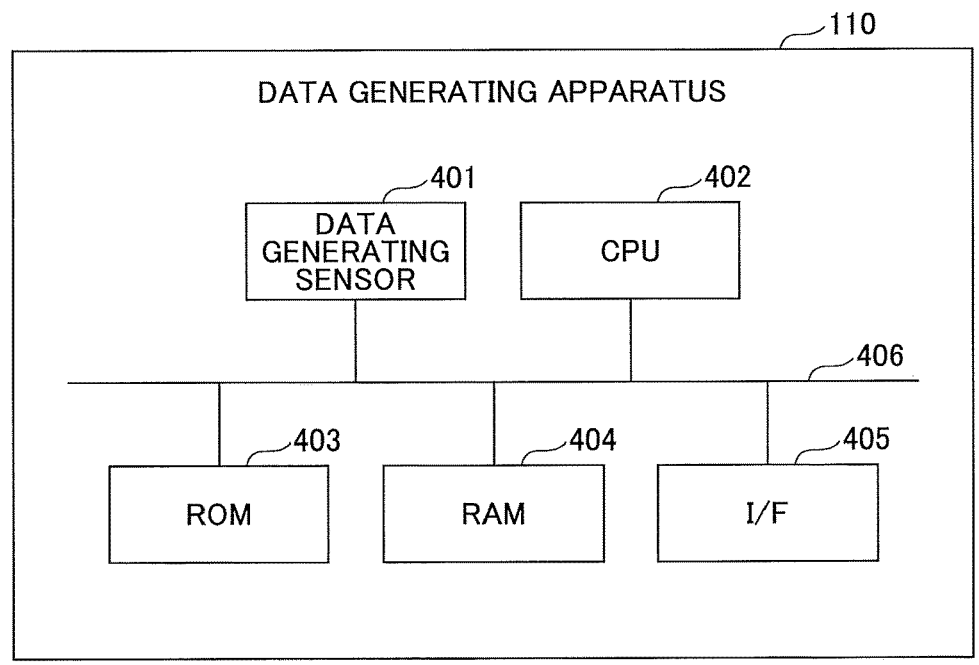
FIGS. 4A and 4B are diagrams respectively illustrating example hardware configurations of a data generating apparatus and a data processing apparatus according to the first embodiment.
Figure 4B:
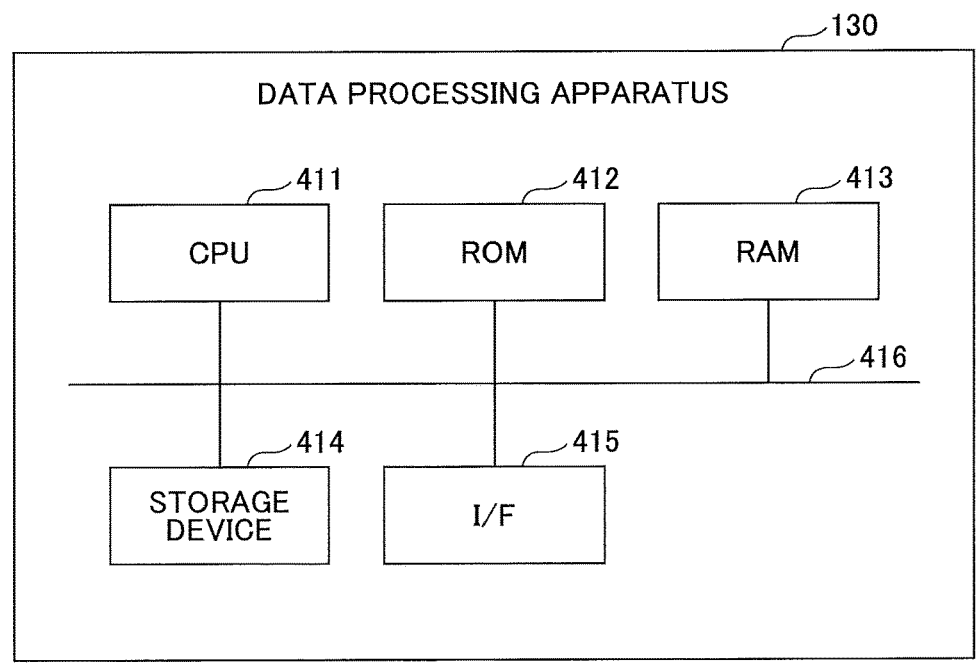

In the following, hardware configurations of the data generating apparatus 110 and the data processing apparatus 130 included in the data distribution system 100 are described. FIGS. 4A and 4B are diagrams respectively illustrating example hardware configurations of the data generating apparatus 110 and the data processing apparatus 130 according to the first embodiment.

In FIG. 4A, the data generating apparatus 110 includes a data generating sensor 401 and a CPU (Central Processing Unit) 402. Further, the data generating apparatus 110 includes a ROM (Read Only Memory) 403, a RAM (Random Access Memory) 404, and an interface (I/F) 405. The above hardware components of the data generating apparatus 110 are connected to each other via a bus 406.

The data generating sensor 401 is a sensor that generates data. In the case where the data generating apparatus 110 is an imaging apparatus, for example, the data generating sensor 401 may be an imaging sensor that converts received light into an electric signal to generate moving image data. The CPU 402 is a computer that executes various programs (e.g., secret sharing data generation program) stored in the ROM 403.

The ROM 403 stores various programs to be executed by the CPU 402 and other programs and data that are used when the CPU 402 executes the various programs. The RAM 404 provides a work area for the CPU 402 when the CPU 402 executes the various programs.

The I/F 405 is connected to the network 160 and exchanges data with the data processing apparatus 130 via the network 160.

In FIG. 4B, the data processing apparatus 130 includes a CPU 411, a ROM 412, a RAM 413, a storage device 414, and an I/F 415. The above hardware components of the data processing apparatus 130 are connected to each other via a bus 416.

Note that the hardware configuration of the data processing apparatus 130 may be substantially the same as the hardware configuration of the data generating apparatus 110, and as such, only features of the data processing apparatus 130 that differ from those of the data generating apparatus 130 are described below. The hardware configuration of the data processing apparatus 130 differs from that of the data generating apparatus 110 in that it includes the storage device 414 and does not include the data generating sensor 401 of the data generating apparatus 110.

The storage device 414 stores a verification program, a secret sharing data generation program, and a delivery program as programs to be executed by the CPU 411. In the data processing apparatus 130, the verification program, the secret sharing data generation program, and the delivery program are stored in the storage device 414. The ROM 412, on the other hand, stores other programs that are used when the CPU 411 executes the verification program, the secret sharing data generation program, and the delivery program. In the present embodiment, the data storage unit 134 is implemented by the storage device 414.

4. Data Generating Apparatus Functional Configuration

Figure 5:
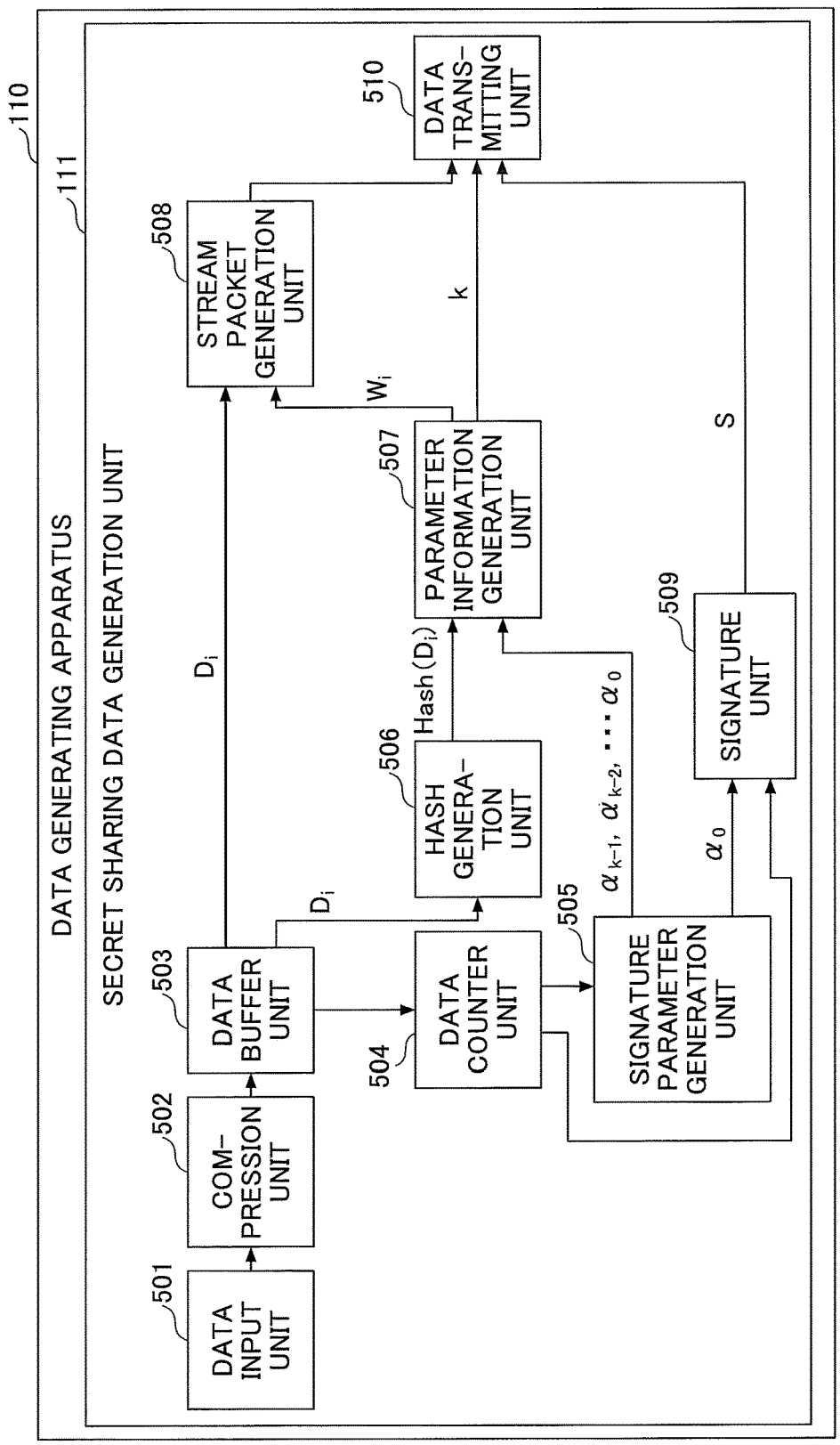
FIG. 5 is a diagram illustrating an example functional configuration of the data generating apparatus according to the first embodiment.

In the following, the functional configuration of the secret sharing data generation unit 111 implemented by the data generating apparatus 110 is described. FIG. 5 is a diagram illustrating an example functional configuration of the data generating apparatus 110 according to the first embodiment.

In FIG. 5, the secret sharing data generation unit 111 includes a data input unit 501, a compression unit 502, a data buffer unit 503, a data counter unit 504, and a signature parameter generation unit 505. Also, the secret sharing data generation unit 111 includes a hash generation unit 506, a parameter information generation unit 507, a stream packet generation unit 508, a signature unit 509, and a data transmitting unit 510.

The data input unit 501 acquires time series data generated by the data generating sensor 401. The compression unit 502 compresses the time series data acquired by the data input unit 501 and generates unit data. The compression unit 502 may use any compression format, such as MPEG or H.264, to compress the acquired time series data to generate unit data.

The data buffer unit 503 temporarily stores the unit data generated by the compression unit 502. The data counter unit 504 counts the number of unit data stored in the data buffer unit 503, and notifies the signature parameter generation unit 505 and the signature unit 509 when the number of unit data stored in the data buffer unit 503 reaches a predetermined number (n).

The signature parameter generation unit 505 includes a random number generator, and upon receiving a notification from the data counter unit 504 that the number of unit data stored in the data buffer unit 503 has reached the predetermined number (n), the signature parameter generation unit 505 acquires k random numbers generated by the random number generator as parameters ($\alpha_{k-1}, \alpha_{k-2}, \ldots \alpha_0$). The signature parameter generation unit 505 communicates the acquired parameters ($\alpha_{k-1}, \alpha_{k-2}, \ldots \alpha_0$) to the parameter information generation unit 507. Also, the signature parameter generation unit 505 communicates the parameter ($\alpha_0$) as secret information to the signature unit 509.

The hash generation unit 506 sequentially acquires unit data ($D_i$) of the unit data stored in the data buffer unit 503, and calculates a hash value (Hash($D_i$)). Note that the hash value of the unit data ($D_i$) is calculated by the hash generation unit 506 in order to reduce the processing load of the data generating apparatus 110.

The parameter information generation unit 507 acquires the hash value (Hash($D_i$)) calculated by the hash generation unit 506 and the parameters ($\alpha_{k-1}, \alpha_{k-2}, \ldots \alpha_0$) acquired by the signature parameter generation unit 505. Also, the parameter information generation unit 507 calculates parameter information ($W_i$) using the above Formula 1 based on the acquired hash value and parameters. Further, the parameter information generation unit 507 outputs the degree number (k) associated with the polynomial used for calculating the parameter information ($W_i$) to the data transmitting unit 510.

The stream packet generation unit 508 associates the unit data ($D_i$) with the parameter information ($W_i$) and acquires secret sharing data. The stream packet generation unit 508 packetizes and outputs the acquired secret sharing data (Di, Wi). Note that the packet format for packetizing the secret sharing data is determined by the transmission format used. For example, when a network interface type transmission format is used, RTSP format or UDP format may be used as the packet format. Also, when the USB interface is used as the transmission format, isochronous transfer may be used as the packet format, for example.

Upon receiving notification from the data counter unit 504 that the count number of stored unit data has reached the predetermined number (n), the signature unit 509 calculates a signature value (S) using the secret information ($\alpha_0$) output by the signature parameter generation unit 505. In the present embodiment, the Sign algorithm expressed by the above Formula 2 is used to calculate the signature value (S). Note, however, that the signature algorithm used for calculating the signature value (S) is not limited to the Sign algorithm described above. For example, the RSA algorithm, the RSASSA-PSS algorithm, or the ElGamal algorithm may be used as well.

The data transmitting unit 510 transmits the secret sharing data ($D_i$, $W_i$) that has been packetized by the stream packet generation unit 508, the degree number (k) associated with the polynomial used by the parameter information generation unit 507, and the signature value (S) calculated by the signature parameter generation unit 505. Note that the data transmitting unit 510 streams the packetized secret sharing data ($D_i$, $W_i$) using a connectionless protocol and transmits the signature value (S) and the degree number (k) using a connection-oriented protocol.

Figure 6:
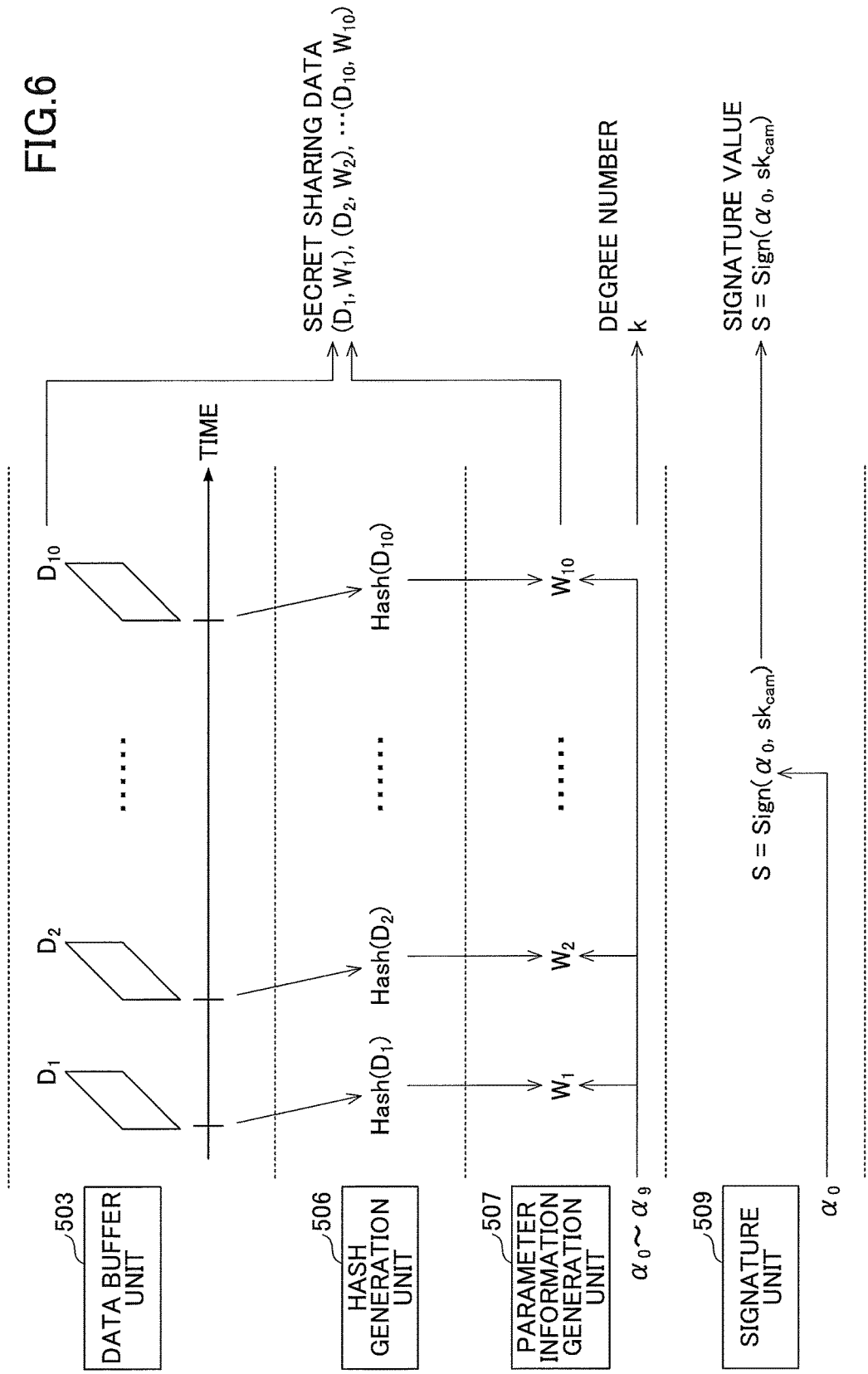
FIG. 6 is a diagram schematically illustrating process operations of the data generating apparatus.

FIG. 6 is a diagram schematically illustrating process operations of the data buffer unit 503, the hash generation unit 506, the parameter information generation unit 507, and the signature unit 509 of the data generating apparatus 110 according to the first embodiment. In the example of FIG. 6, it is assumed that the predetermined number "n" is equal to "10".

In FIG. 6, when the hash generation unit 506 acquires the unit data ($D_1$) stored in the data buffer unit 503, the hash generation unit 506 calculates a hash value (Hash($D_1$)).

The parameter information generation unit 507 acquires the hash value (Hash($D_1$)) calculated by the hash generation unit 506 and parameters ($\alpha_9, \alpha_8, \ldots \alpha_0$) output by the signature parameter generation unit 505. Also, the parameter information generation unit 507 calculates parameter information ($W_1$) based on the hash value (Hash($D_1$)) and the parameters ($\alpha_9, \alpha_8, \ldots \alpha_0$), and outputs the calculated parameter information ($W_1$).

Process operations as described above are similarly performed with respect to each of the other unit data ($D_2$, $D_3$, ... $D_{10}$) stored in the data buffer unit 503, and a result, the parameter information generation unit 507 outputs parameter information ($W_2, W_3, \ldots W_{10}$).

The stream packet generation unit 508 associates each of the unit data ($D_1, D_2, \ldots D_{10}$) stored in the data buffer unit 503 with the corresponding parameter information ($W_1, W_2, \ldots W_{10}$) output by the parameter information generation unit 507. As a result, the stream packet generation unit 508 acquires secret sharing data (($D_1, W_1$), ($D_2, W_2$), ... ($D_{10}, W_{10}$)).

The parameter information generation unit 507 also outputs the degree number (k) associated with the polynomial used for calculating the parameter information.

Also, the signature unit 509 calculates a signature value (S) using the secret information ($\alpha_0$) output by the signature parameter generation unit 505 and outputs the calculated signature value (S).

By having the various functional units of the secret sharing data generation unit 111 implement the process operations as described above, the secret sharing data generation unit 111 may be able to output signed data (secret sharing data, degree number, signature value) based on time series that has been generated.

5. Secret Sharing Data Generation Process

Figure 7:
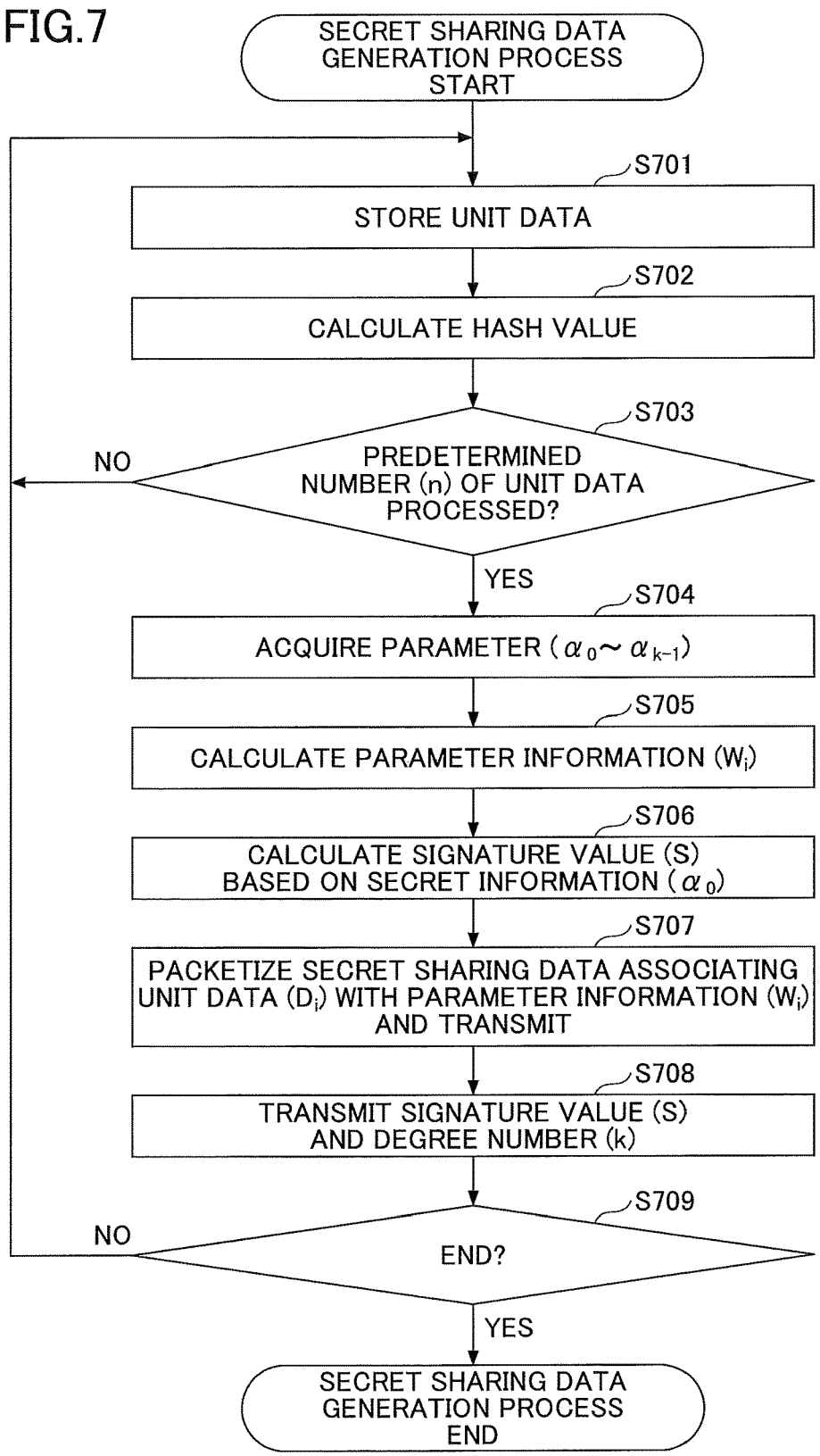
FIG. 7 is a flowchart illustrating an example secret sharing data generation process.

In the following, a secret sharing data generation process implemented by the secret sharing data generation unit 111 is described. FIG. 7 is a flowchart illustrating an example secret sharing data generation process implemented by the secret sharing data generation unit 111. Note that the secret sharing data generation unit 111 may execute the secret sharing data generation process of FIG. 7 when the data generating sensor 401 starts generating time series data, for example.

In step S701, the data input unit 501 acquires time series data generated by the data generating sensor 401. The compression unit 502 compresses the acquired time series data to generate unit data and stores the generated unit data in the data buffer unit 503.

In step S702, the hash generation unit 506 acquires unit data ($D_i$) from the data buffer unit 503 and calculates a hash value (Hash($D_i$)).

In step S703, the data counter unit 504 determines whether a predetermined number (n) of unit data are stored in the data buffer unit 503. If it is determined that the predetermined number (n) of unit data are not stored in the data buffer unit 503 (NO in step S703), the data counter unit 504 determines that the hash generation unit 506 has not yet calculated hash values for the predetermined number (n) of unit data, and the process returns to step S701. On the other hand, if it is determined that the predetermined number (n) of unit data are stored in the data buffer unit 503 (YES in step S703), the data counter unit 504 determines that the hash generation unit 506 has generates hash values for the predetermined number (n) of unit data, and the process proceeds to step S704.

In step S704, the signature parameter generation unit 505 acquires k random numbers generated by the random number generator as parameters ($\alpha_{k-1}, \alpha_{k-2}, \ldots \alpha_0$).

In step S705, the parameter information generation unit 507 acquires the predetermined number (n) of hash values (Hash($D_i$)) and the k parameters ($\alpha_{k-1}, \alpha_{k-2}, \ldots \alpha_0$). Also, the parameter information generation unit 507 calculates n sets of parameter information ($W_i$) based on the acquired predetermined number (n) of hash values and the k parameters. Further, the parameter information generation unit 507 outputs the degree number (k) associated with the polynomial used for calculating the n sets of parameter information ($W_i$).

In step S706, the signature unit 509 acquires the parameter ($\alpha_0$) acquired by the signature parameter generation unit 505 as secret information and adds a signature to the acquired secret information ($\alpha_0$). As a result, the signature unit 509 outputs a signature value (S) based on the acquired confidential information ($\alpha_0$).

In step S707, the stream packet generation unit 508 associates the unit data ($D_i$) stored in the data buffer unit 503 with the parameter information ($W_i$) output by the parameter information generation unit 507 to obtain secret sharing data. In addition, the stream packet generation unit 508 packetizes the obtained secret sharing data and outputs the packetized secret sharing data ($D_i$, $W_i$). Further, the data transmitting unit 510 transmits the secret sharing data output by the parameter information generation unit 507 to the data processing apparatus 130 via the network 160.

In step S708, the data transmitting unit 510 transmits the signature value (S) output by the signature unit 509 and the degree number (k) output by the parameter information generation unit 507 to the data processing apparatus 130 via the network 160.

In step S709, the data input unit 501 determines whether to terminate the secret sharing data generation process. If time series data generated by the data generating sensor 401 continues to be input, the process returns to step S701 without ending the secret sharing data generation process. On the other hand, if it is determined that input of time series data has stopped, the secret sharing data generation process is terminated.

6. Data Processing Apparatus Functional Configuration

Figure 8:
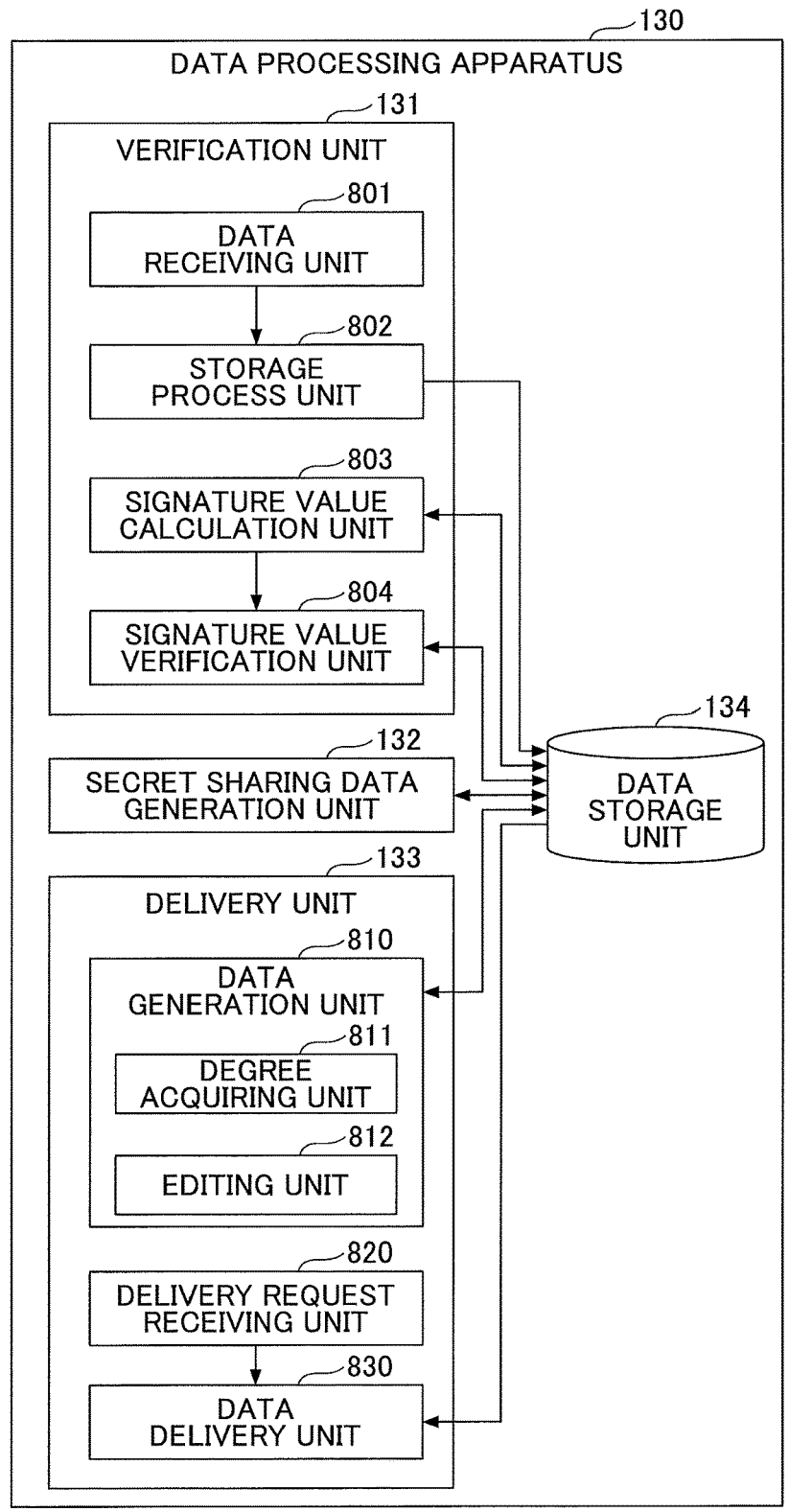
FIG. 8 is a diagram illustrating an example functional configuration of the data processing apparatus according to the first embodiment.

In the following, the functional configurations of the verification unit 131 and the delivery unit 133 implemented by the data processing apparatus 130 are described. Note that the functional configuration of the secret sharing data generation unit 132 may be substantially the same as the functional configuration of the secret sharing data generation unit 111, and as such, a description thereof will be omitted here. FIG. 8 is a diagram illustrating an example functional configuration of the data processing apparatus 130.

(1) Verification Unit

In FIG. 8, the verification unit 131 includes a data receiving unit 801, a storage process unit 802, a signature value calculation unit 803, and a signature value verification unit 804.

The data receiving unit 801 receives signed data (secret sharing data, degree number, signature value) from the data generating apparatus 110. Further, the data receiving unit 801 receives unsigned data (time-series data) from the data generating apparatus 120.

The storage process unit 802 stores signed data (secret sharing data, degree number, signature value) and unsigned data (time-series data) received by the data receiving unit 801 in the data storage unit 134.

When signed data is newly stored in the data storage unit 134 by the storage process unit 802, the signature value calculation unit 803 performs signature verification of the signed data by determining whether at least k sets of secret sharing data are included in each section of the signed data. If the signature value calculation unit 803 determines that the number of secret sharing data sets included in each section is less than k, the signature value calculation unit 803 determines that the signature verification has failed.

If the signature value calculation unit 803 determines that the number of secret sharing data sets included in each section is k or more, the signature value calculation unit 803 reads the k sets of secret sharing data for each section of the singed data from the data storage unit 134. The signature value calculation unit 803 then calculates secret information ($\alpha_0$) based on the k sets of secret sharing data using the following Formula 3.

$$\alpha_0 = \Sigma_{(p=1 \sim k)} W_{ip} \Pi_{(0 \leq q \leq k, q \neq p)} \text{Hash}(D_{iq})/(\text{Hash}(D_{iq}) - \text{Hash}(D_{ip})) \quad \text{(Formula 3)}$$

The signature value verification unit 804 reads the signature value (S) stored in the data storage unit 134 and calculates the secret information ($\alpha_0$) based on a verification key "$vk_{cam}$" using a verification algorithm Vrfy (see Formula 4 below). Note that in a case where the signature value (S) stored in the data storage unit 134 is generated by the secret sharing data generation unit 132 (as opposed to the secret sharing data generation unit 111), a verification key "$vk_{serv}$" may be used in the Formula 4 below instead of the verification key "$vk_{cam}$", for example.

$$Vrfy(S, vk_{cam}) = \alpha_0 \quad \text{(Formula 4)}$$

Note that the signature value verification unit 804 performs signature verification by comparing the secret information ($\alpha_0$) calculated by the signature value calculation unit 803 with the secret information ($\alpha_0$) calculated based on the signature value (S) using the verification algorithm Vrfy. If the above two secret information ($\alpha_0$) match, the signature value verification unit 804 determines that the signature verification has been successful. On the other hand, if the above two secret information ($\alpha_0$) do not match, the signature value verification unit 804 determines that the signature verification has failed.

Note that the signature verification result (success/failure determination result) by the signature value calculation unit 803 or the signature value verification unit 804 is stored in the data storage unit 134 in association with the signed data.

(2) Delivery Unit

In FIG. 8, the delivery unit 133 includes a data generation unit 810, a delivery request receiving unit 820, and a data delivery unit 830.

The data generation unit 810 further includes a degree acquiring unit 811 and an editing unit 812. When signed data is newly stored in the data storage unit 134, the degree acquiring unit 811 acquires the degree number (k) included in the signed data.

The editing unit 812 reads the secret sharing data and the signature value included in signed data newly stored in the data storage unit 134, generates basic data, and stores the generated basic data in the data storage unit 134. Also, the editing unit 812 reads the secret sharing data and the signature value included in the signed data newly stored in the data storage unit 134, generates edited data based on the degree number (k) acquired by the degree acquiring unit 811, and outputs the edited data to the data storage unit 134.

The delivery request receiving unit 820 receives a delivery request from the terminal 140 or the mobile terminal 150. The delivery request receiving unit 820 determines a data delivery destination based on the received delivery request.

The data delivery unit 830 selects either basic data or edited data as data to be delivered based on the data delivery destination determined by the delivery request receiving unit 820, reads the selected data from the data storage unit 134, and delivers the data to the data delivery destination.

7. Data in Data Storage Unit

In the following, data stored in the data storage unit 134 are described. FIGS. 9A and 9B are diagrams illustrating examples of data stored in the data storage unit 134.

FIG. 9A illustrates an example of signed data storage information 910 storing information relating to signed data received from the data generating apparatus 110. In FIG. 9A, the signed data storage information 910 includes, as information items, "signed data", "signature verification result", "basic data", and "edited data".

The "signed data" stores signed data (secret sharing data, degree number, signature value) transmitted from the data generating apparatus 110 and received by the data receiving unit 801.

The "signature verification result" stores the result of the signature verification performed on the received signed data by the signature value calculation unit 803 and the signature value verification unit 804.

The "basic data" stores basic data for the signed data stored in the data storage unit 134 that is generated by the editing unit 812 using the secret sharing data and the signature value of the signed data.

The "edited data" stores edited data for the signed data stored in the data storage unit 134 that is generated by the editing unit 812 by deleting a portion of the secret sharing data and extracting the remaining portion of the secret sharing data according to the degree number.

FIG. 9B illustrates an example of unsigned data storage information 920 storing information relating to unsigned data received from the data generating apparatus 120. In FIG. 9B, the unsigned data storage information 920 includes, as information items, "unsigned data", "signed data", "basic data", and "edited data".

The "unsigned data" stores unsigned data (time series data) transmitted from the data generating apparatus 120 and received by the data receiving unit 801.

The "signed data" stores signed data (secret sharing data, degree number, signature value) that is generated by the secret sharing data generation unit 132 by reading unsigned data and performing a secret sharing data generation process on the unsigned data.

The "basic data" stores basic data for the signed data stored in the data storage unit 134 that is generated by the editing unit 812 using the secret sharing data and the signature value of the signed data.

The "edited data" stores edited data for the signed data stored in the data storage unit 134 that is generated by the editing unit 812 by deleting a portion of the secret sharing data and extracting the remaining portion of the secret sharing data according to the degree number.

8. Processes of Data Processing Apparatus

In the following, processes executed by the above functional units of the data processing apparatus 130 are described. Specifically, a verification process executed by the verification unit 131 and a delivery process executed by the delivery unit 133 are described. Note that a secret sharing data generation process executed by the secret sharing data generation unit 132 may be substantially the same as the secret sharing data generation process of FIG. 7 that is executed by the secret sharing data generation unit 111, and as such, a description thereof will be omitted.

(1) Verification Process by Verification Unit 131

Figure 10:
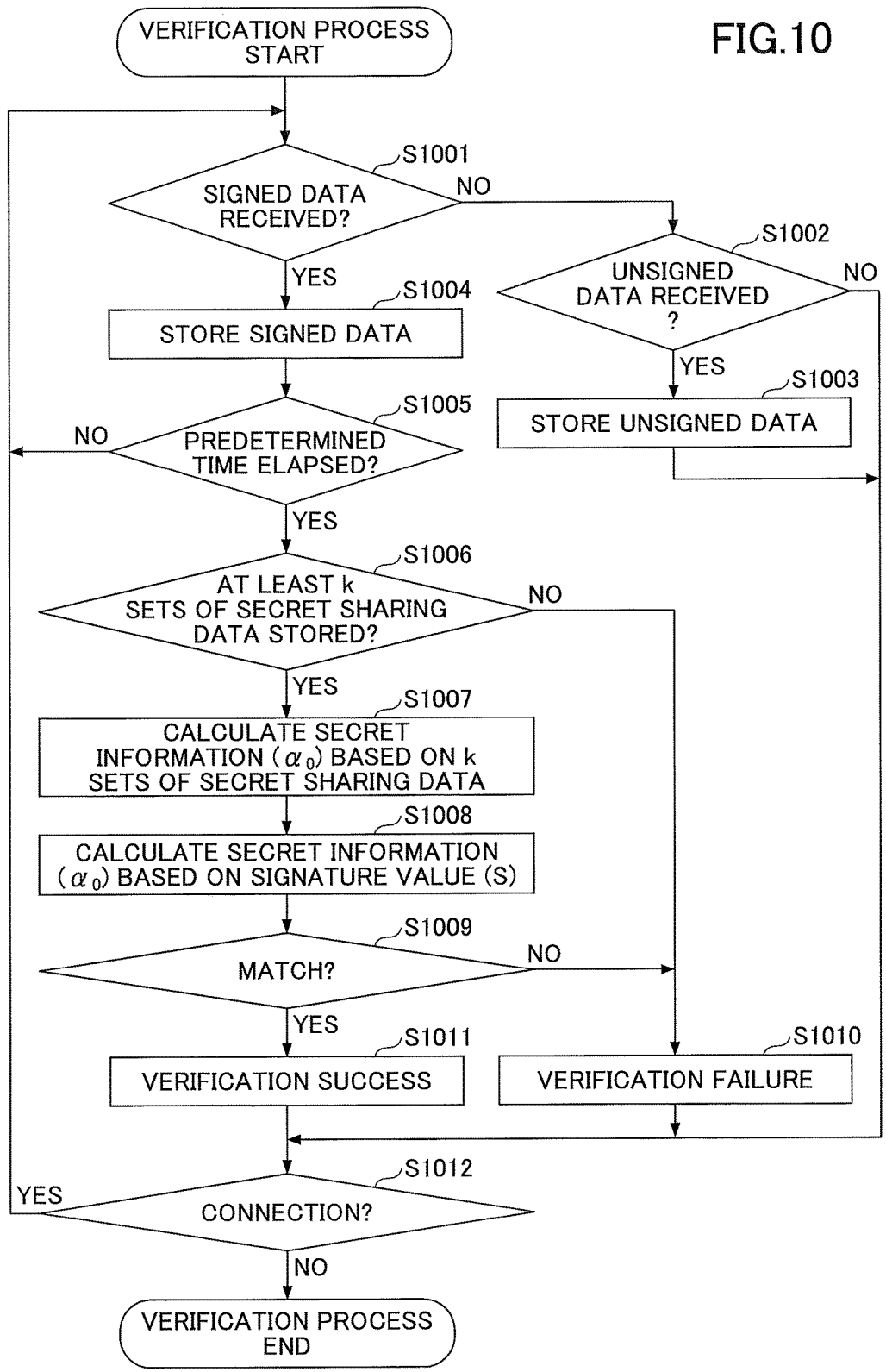
FIG. 10 is a flowchart illustrating an example verification process implemented by the data processing apparatus.

FIG. 10 is a flowchart illustrating an example verification process executed by the verification unit 131. Note that the process of FIG. 10 may be executed when data processing apparatus 130 and the data generating apparatus 110 and the data generating apparatus 120 are communicably connected.

In step S1001, the data receiving unit 801 determines whether signed data transmitted from the data generating apparatus 110 has been received. If it is determined in step S1001 that signed data has not been received, the process proceeds to step S1002.

In step S1002, the data receiving unit 801 determines whether unsigned data transmitted from the data generating apparatus 120 has been received. If it is determined in step S1002 that unsigned data has been received, the process proceeds to step S1003.

In step S1003, the storage process unit 802 stores the unsigned data (time series data) received by the data receiving unit 801 in the unsigned data storage information 920 of the data storage unit 134 and proceeds to step S1012. On the other hand, if it is determined in step S1002 that unsigned data has not been received, the process directly proceeds to step S1012.

If it is determined in step S1001 that signed data has been received, the process proceeds to step S1004. In step S1004, the storage process unit 802 stores the signed data (secret sharing data, degree number, signature value) received by the data receiving unit 801 in the signed data storage information 910 of the data storage unit 134.

In step S1005, the data receiving unit 801 determines whether a predetermined time has elapsed. If it is determined in step S1005 that the predetermined time has not yet elapsed, the process waits until the predetermined time has elapsed.

On the other hand, if it is determined in step S1005 that the predetermined time has elapsed, the process proceeds to step S1006. In step S1006, the signature value calculation unit 803 determines whether at least k sets of secret sharing data is included in each section of the signed data stored in the data storage unit 134.

If it is determined in step S1006 that at least k sets of secret sharing data are not included in each section of the signed data, the process proceeds to step S1010. In step S1010, the signature value calculation unit 803 determines that the signature verification has failed, and stores the determination result of the signature verification in the signed data storage information 910.

On the other hand, if it is determined in step S1006 that at least k sets of secret sharing data are included in each section of the signed data, the process proceeds to step S1007. In step S1007, the signature value calculation unit 803 reads the at least k sets of secret sharing data for each section of the signed data from the data storage unit 134 and calculates secret information ($\alpha_0$) using the above Formula 3.

In step S1008, the signature value verification unit 804 reads the signature value (S) for each section stored in the data storage unit 134 and calculates secret information ($\alpha_0$) based on a verification key using the above verification algorithm Vrfy (Formula 4).

In step S1009, the signature value verification unit 804 performs signature verification with respect to each section of the signed data by comparing the secret information ($\alpha_0$) calculated by the signature value calculation unit 803 with the secret information ($\alpha_0$) calculated by the signature value verification unit 804 based on the signature value (S) using the verification algorithm Vrfy. If the compared information do not match, the process proceeds to step S1010. In step S1010, the signature value calculation unit 803 determines that the signature verification has failed and stores the determination result of the signature verification in the signed data storage information 910.

On the other hand, if it is determined in step S1009 that the compared information match, the process proceeds to step S1011. In step S1011, the signature value calculation unit 803 determines that the signature verification has been successful and stores the determination result of the signature verification in the signed data storage information 910.

In step S1012, the data receiving unit 801 determines whether the data processing apparatus 130 is continuing communication with the data generating apparatus 110 and the data generating apparatus 120. If it is determined that the communication is continuing, the data receiving unit 801 returns to step S1001. On the other hand, if it is determined that communication has been discontinued, the signature value calculation unit 803 and/or the signature value verification unit 804 performs signature verification with respect to signed data that has been stored in the data storage unit 134 but has not yet been processed after which the verification process of FIG. 10 is terminated.

(2) Delivery Process by Delivery Unit 133

Figure 11:
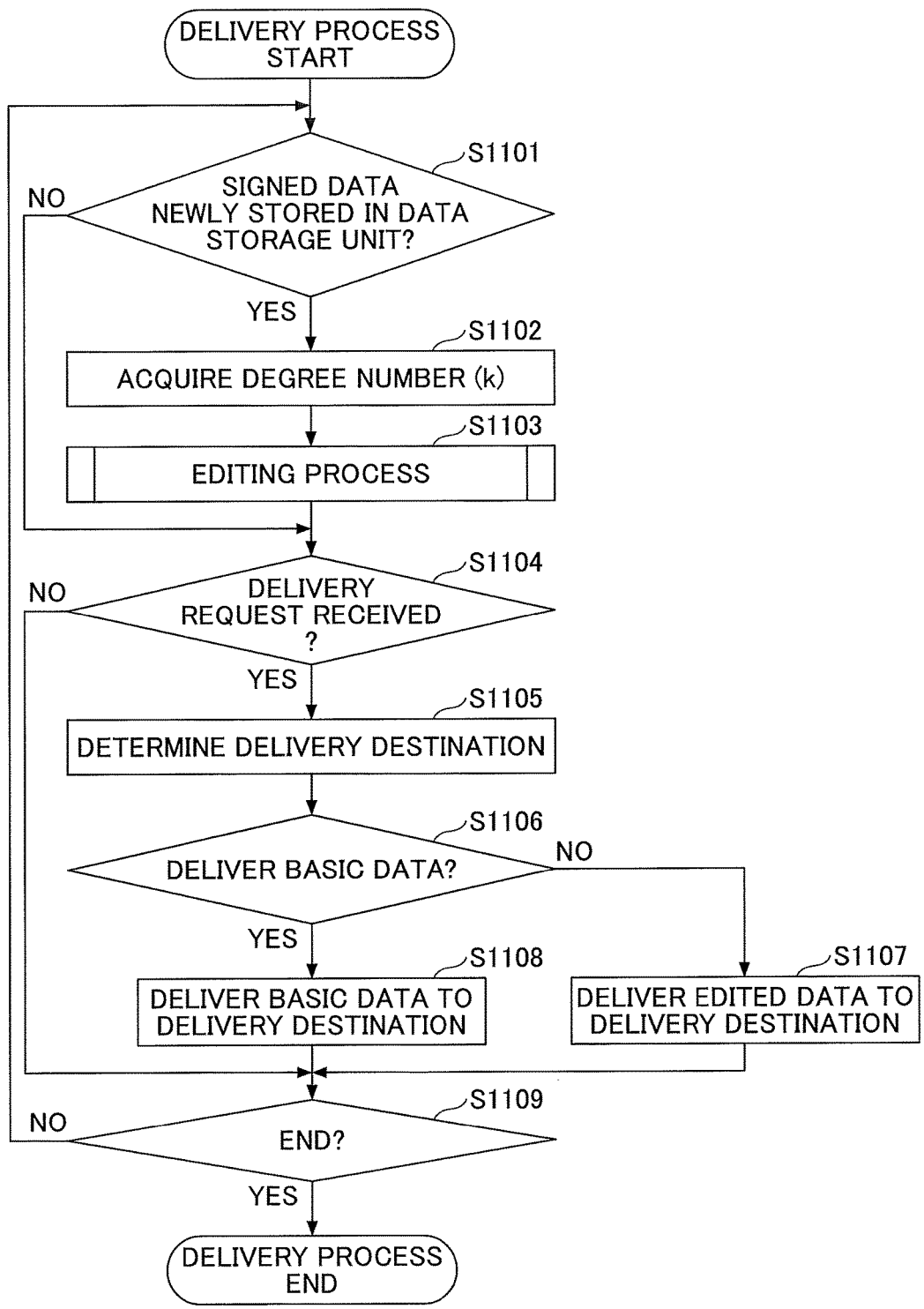
FIG. 11 is a flowchart illustrating an example delivery process implemented by the data processing apparatus.

FIG. 11 is a flowchart illustrating an example delivery process executed by the delivery unit 133. Note that the process of FIG. 11 may be executed when the data processing apparatus 130 starts a delivery service.

In step S1101, the data generation unit 810 determines whether signed data has been newly stored in the data storage unit 134 by the storage process unit 802 or the secret sharing data generation unit 132. If it is determined that signed data has not been newly stored in the data storage unit 134, the process proceeds to step S1104. Also, even if signed data has been newly stored in the data storage unit 134 by the storage process unit 802 if it is determined that the signature verification performed on the signed data by the signature value calculation unit 803 or the signature value verification unit 804 resulted in "failure", the process proceeds to step S1104.

On the other hand, if it is determined that signed data has been newly stored in the data storage unit 134 by the storage processing unit 802 and the signature verification performed on the signed data by the signature value calculation unit 803 and the signature value verification unit 804 has been "successful", the process proceeds to step S1102. Also, if it is determined that signed data has been newly stored in the data storage unit 134 by the secret sharing data generation unit 132, the process proceeds to step S1102.

In step S1102, the degree acquiring unit 811 refers to the signed data storage information 910 or the unsigned data storage information 920 and acquires the degree number (k) included in the signed data.

In step S1103, the editing unit 812 performs an editing process on the signed data to generate basic data and edited data. Note that details of the editing process performed by the editing unit 812 are described below.

In step S1104, the delivery request receiving unit 820 determines whether a delivery request has been received from the terminal 140 or the mobile terminal 150. In step S1104, if it is determined that a delivery request has not been received, the process proceeds to step S1109.

On the other hand, if it is determined that a delivery request has been received in step S1104, the process proceeds to step S1105. In step S1105, the delivery request receiving unit 820 determines the data delivery destination by identifying the delivery request source.

In step S1106, the data delivery unit 830 determines whether to deliver the basic data to the data delivery destination that has been determined in step S1105. If it is determined that the data delivery destination corresponds to the terminal 140 (e.g., if it is determined that the delivery request source has a processing capability greater than or equal to a predetermined value), the data delivery unit 830 determines that the basic data is to be delivered and proceeds to step S1108.

In step S1108, the data delivery unit 830 reads the basic data from the data storage unit 134 and delivers the basic data to the terminal 140 corresponding to the data delivery destination. Note, however, that if the signature verification performed on the signed data resulted in "failure" such that basic data for the signed data has not been generated, the data delivery will not be performed.

On the other hand, if it is determined in step S1105 that the data delivery destination corresponds to the mobile terminal 150 (e.g., if it is determined that the delivery request source has a processing capability that is less than the predetermined value), the data delivery unit 830 determines in step S1106 that the edited data is to be delivered and proceeds to step S1107.

In step S1107, the data delivery unit 830 reads the edited data from the data storage unit 134 and delivers the edited data to the mobile terminal 150 corresponding to the data delivery destination. Note, however, that if the signature verification performed on the signed data resulted in "failure" such that edited data for the signed data has not been generated, data delivery will not be performed.

In step S1109, the delivery unit 133 determines whether to continue the delivery service. If the delivery service is to be continued, the delivery unit 133 returns to step S1101. On the other hand, if the delivery service is to be discontinued, the delivery process of FIG. 11 is terminated.

(3) Editing Process by Editing Unit 812

Figure 12:
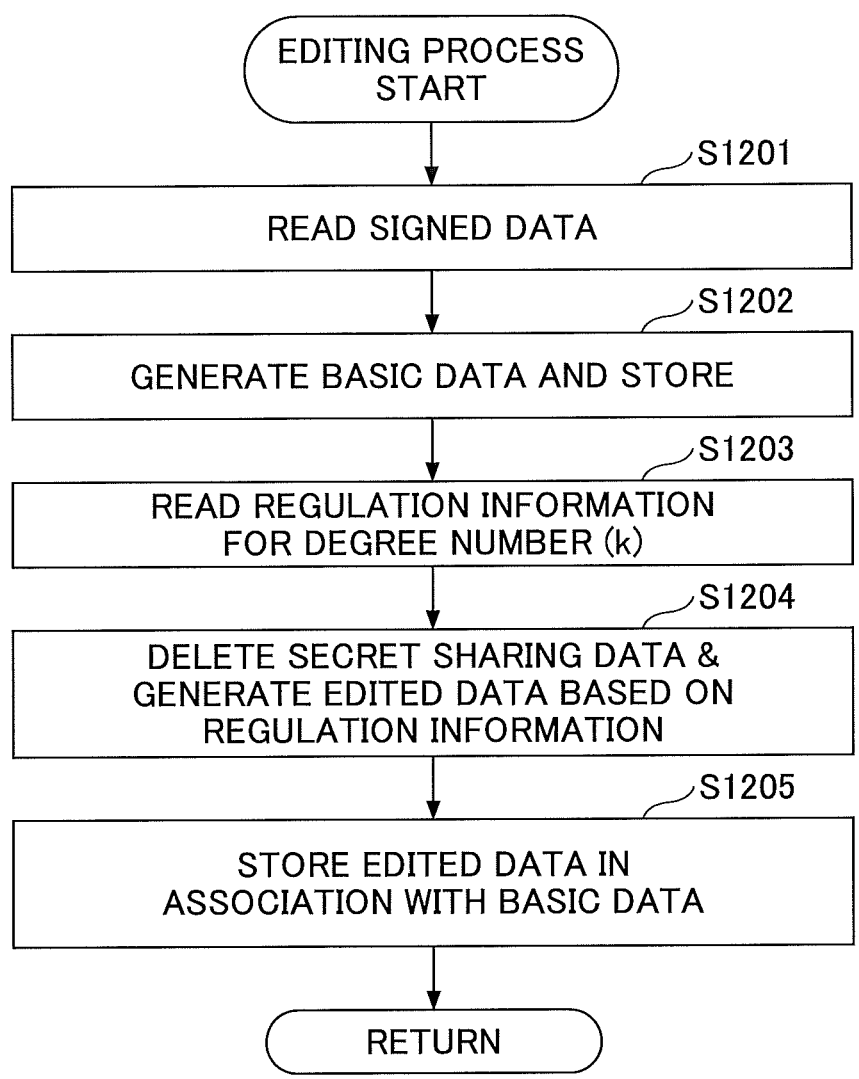
FIG. 12 is a flowchart illustrating an example editing process implemented by the data processing apparatus.

In the following, the editing process (step S1103) performed by the editing unit 812 is described. FIG. 12 is a flowchart illustrating an example editing process performed by the editing unit 812.

In step S1201, the editing unit 812 reads newly stored signed data from the data storage unit 134.

In step S1202, the editing unit 812 generates basic data based on the secret sharing data and the signature value included in the signed data and stores the basic data in the data storage unit 134.

In step S1203, the editing unit 812 reads regulation information provided for the degree number (k) included in the signed data. Note that "regulation information" corresponds to a table provided for each degree number for regulating deletion and extraction of secret sharing data upon editing signed data such that the authenticity of the signed data can still be ensured even after an editing process of deleting a portion of secret sharing data included in each section of signed data and extracting a remaining portion of the secret sharing data is performed.

In step S1204, the editing unit 812 performs the editing process of deleting a portion of the secret sharing data in each section of the signed data and extracting the remaining portion of the secret sharing data based on the regulation information read in step S1203 to generate edited data.

In step S1205, the editing unit 812 stores the edited data generated in step S1204 in association with the basic data stored in step S1202.

Figure 13:
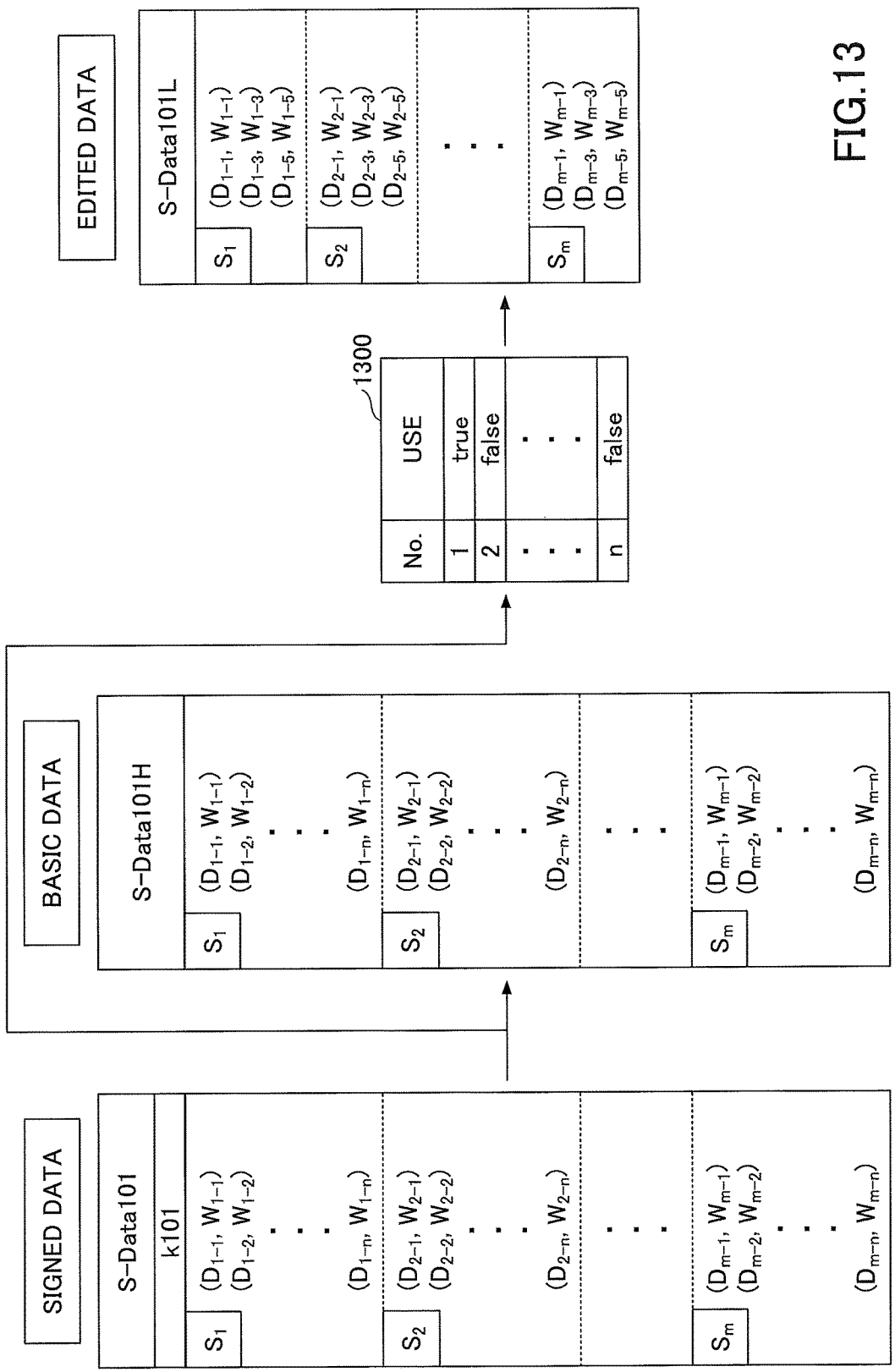
FIG. 13 is a diagram schematically illustrating the editing process.

FIG. 13 is a diagram illustrating an example overview of the editing process performed by the editing unit 812. Note that FIG. 13 illustrates an example case where signed data "S-Data101" is read from the storage unit 134. In FIG. 13, the signed data "S-Data101" includes the degree number (k101) and is made up of m sections. Also, each section of the signed data "S-Data101" includes a predetermined number (n) of secret sharing data sets (e.g., $(D_{1-1}, W_{1-1})$ to $(D_{1-N}, W_{1-n})$). Further, each section of the signed data "S-Data101"

includes a signature value calculated for the section (e.g., "$S_1$" for the first section, "$S_2$" for the second section, and "$S_m$" for the $m^{th}$ section). The signature value and the secret sharing data included in each section are associated with each other.

The editing unit 812 generates basic data "S-Data101H" based on the secret sharing data and the signature value included in the signed data "S-data101".

Also, the editing unit 812 reads regulation information 1300 provided for the degree number (k101). In the regulation information 1300, the value "true" or "false" is assigned for each of numbers 1 through n corresponding to sequence numbers of the secret sharing data sets included in each section of the signed data "S-Data101". With respect to each section of the signed data "S-Data101", the editing unit 812 performs a process of extracting the secret sharing data sets with sequence numbers corresponding to the numbers that are assigned the value "true" in the regulation information 1300. Also, with respect to each section of the signed data "S-Data101", the editing unit 812 performs a process of deleting the secret sharing data sets with sequence numbers corresponding to the numbers that are assigned the value "false" in the regulation information 1300.

In this way, the editing unit 812 generates edited data "S-Data101L". Note that FIG. 13 illustrates an example case where the editing unit 812 reads the regulation information 1300 that is provided for the degree number "3" (k101=3) and three secret sharing data sets are extracted for each section of the signed data "S-Data101" while the remaining secret sharing data sets are deleted.

9. Application Examples

In the following, examples of data delivered in the data distribution system 100 are described.

(1) First Application Example

Figure 14:
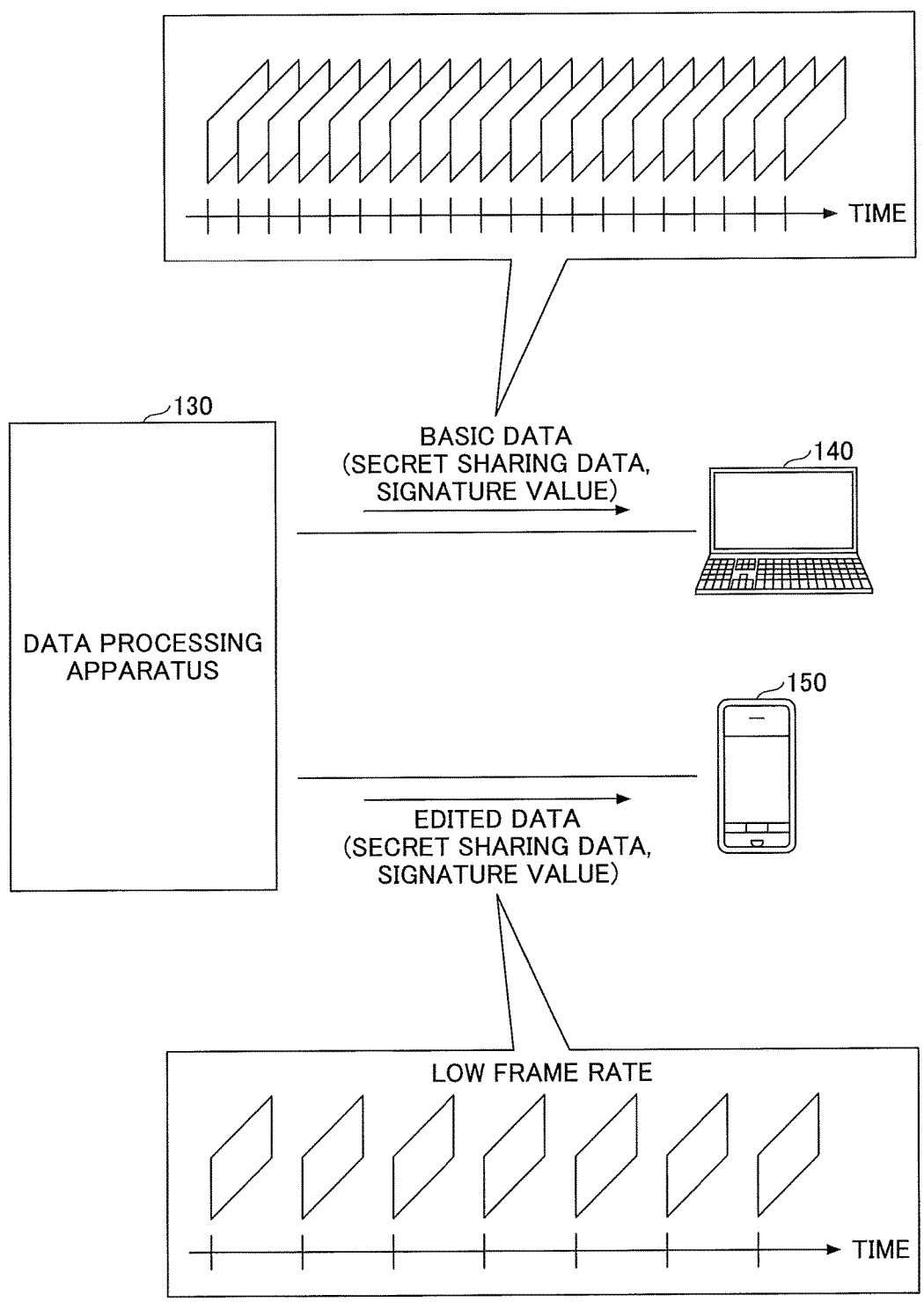
FIG. 14 is a diagram illustrating examples of data delivered in the data distribution system according to the first embodiment.

FIG. 14 is a diagram illustrating examples of data delivered in the data delivery system 100. In the example of FIG. 14, the time series data corresponds to moving image data and the unit data corresponds to a frame.

In FIG. 14, the data processing apparatus 130 delivers basic data to the terminal 140 that has high processing capability and delivers edited data to the mobile terminal 150 that has low processing capability.

In the case where the unit data corresponds to a frame, the editing unit 812 deletes one or more secret sharing data sets from n secret sharing data sets generated based on n frames and extracts k remaining secret sharing data sets to generate edited data. At this time, the editing unit 812 may evenly thin out secret sharing data sets from the n secret sharing data sets to generate edited data with a low frame rate, for example.

As a result, in FIG. 14, the data processing apparatus 130 can deliver edited data with a low frame rate to the mobile terminal 150.

(2) Second Application Example

Figure 15:
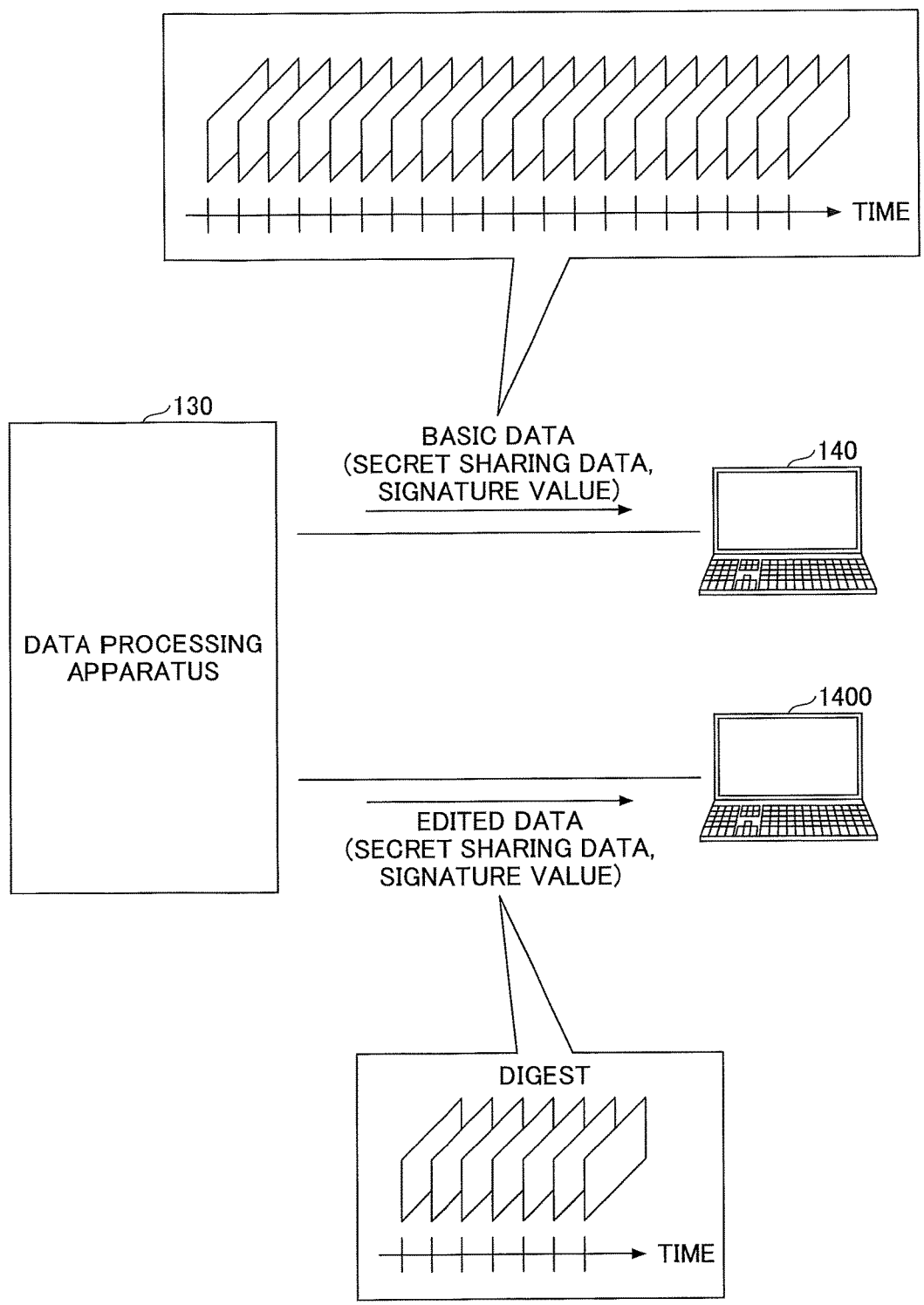
FIG. 15 is a diagram illustrating other examples of data delivered in the data distribution system according to the first embodiment.

FIG. 15 is a diagram illustrating other examples of data delivered in the data distribution system 100. In the example of FIG. 15, the time series data corresponds to moving image data and the unit data corresponds to a frame.

In FIG. 15, the data processing apparatus 130 delivers basic data to the terminal 140 that is authorized to view the moving image data and transmits edited data to a terminal 1400 that is not authorized to view the moving image data.

In the case where the unit data corresponds to a frame, the editing unit 812 deletes one or more secret sharing data sets from n secret sharing data sets generated based on n frames and extracts k remaining secret sharing data sets to generate edited data. At this time, the editing unit 812 may extract k secret sharing data sets that are based on predetermined frames from the n secret sharing data sets to generate edited data constituting a digest video, for example.

As a result, in FIG. 15, the data processing apparatus 130 can deliver edited data constituting a digest video to the terminal 1400.

(3) Third Application Example

Figure 16:
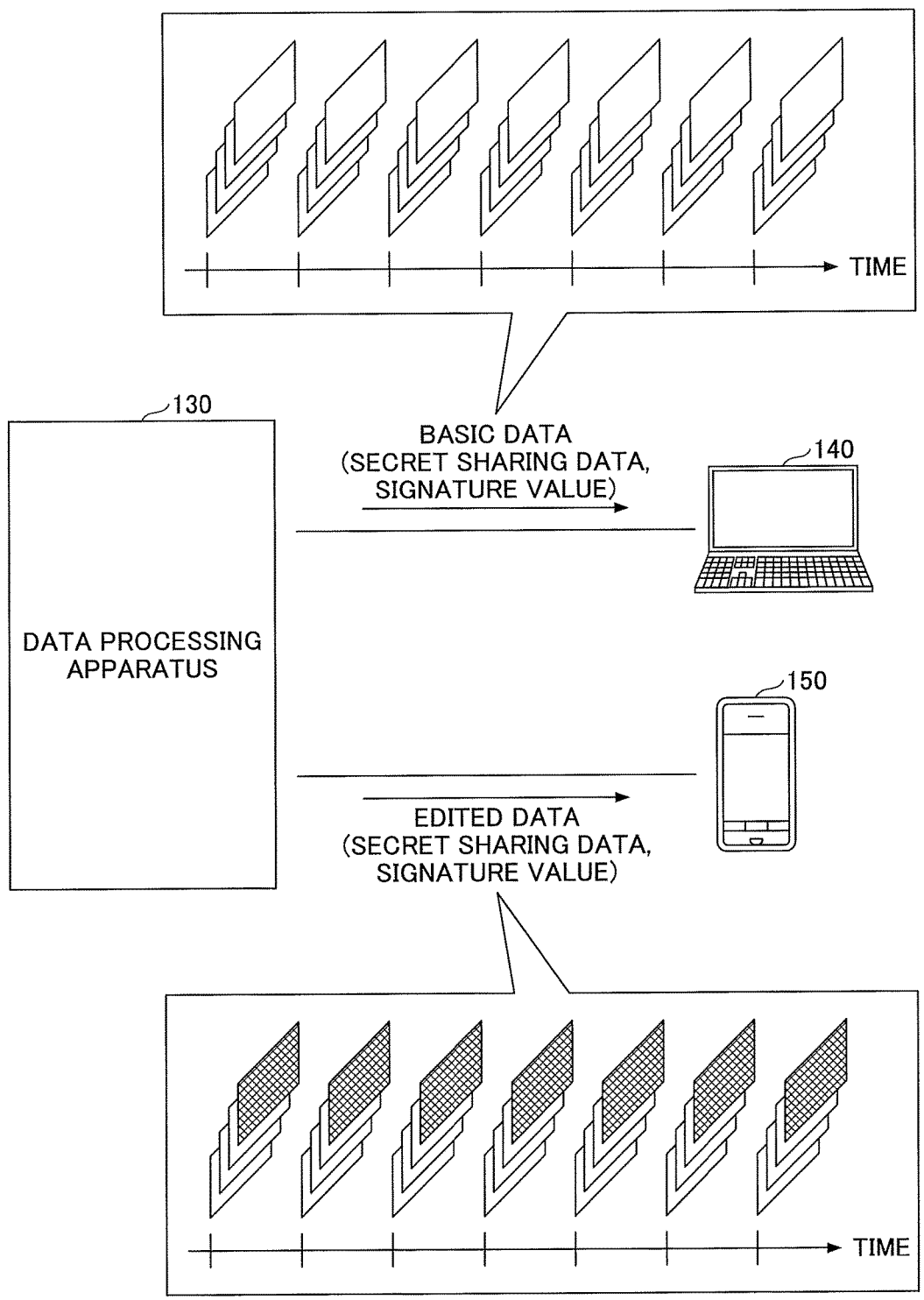
FIG. 16 is a diagram illustrating other examples of data delivered in the data distribution system according to the first embodiment.

FIG. 16 is a diagram illustrating other examples of data delivered in the data distribution system 100. In the example of FIG. 16, the time series data corresponds to moving image data and the unit data corresponds to a frame. Note, however, that FIG. 16 illustrates a case where one image is formed by a plurality of frames.

In FIG. 16, the data processing apparatus 130 delivers basic data to the terminal 140 having high processing capability and delivers edited data to the mobile terminal 150 having low processing capability.

In the case where the unit data corresponds to a frame and one image is formed by a plurality of frames, the editing unit 812 may delete a predetermined frame of each image and extract k secret sharing data sets from n secret sharing data sets to generate edited data. Note that in FIG. 16, a frame deleted by the editing unit 812 from each image is shaded. In this way, the editing unit 812 can generate edited data maintaining the frame rate.

As a result, in FIG. 16, the data processing apparatus 130 can deliver edited data to the mobile terminal 150 at the same frame rate as that for delivering the basic data to the terminal 140.

(4) Fourth Application Example

Figure 17:
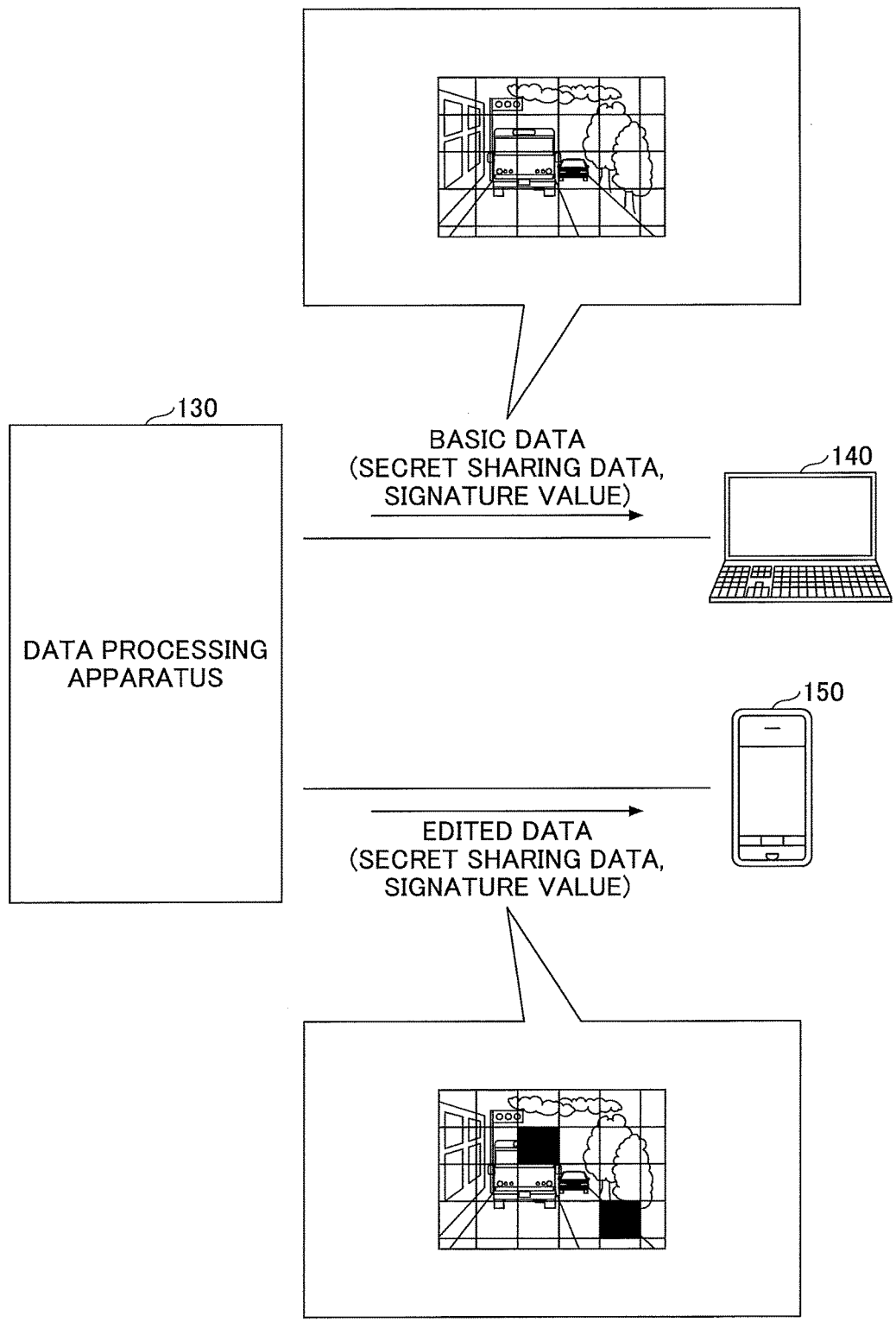
FIG. 17 is a diagram illustrating other examples of data delivered in the data distribution system according to the first embodiment.

FIG. 17 is a diagram illustrating other examples of data delivered in the data distribution system 100. In the example of FIG. 17, the time series data corresponds to moving image data, and the unit data corresponds to a region within one frame.

In FIG. 17, the data processing apparatus 130 delivers basic data to the terminal 140 having high processing capability and delivers edited data to the mobile terminal 150 having low processing capability.

In the case where the unit data corresponds to a region within a frame, the editing unit 812 may delete a secret sharing data set corresponding to a predetermined region within each frame and extract k secret sharing data sets from the n secret sharing data sets to generate edited data. In this way, the editing unit 812 can generate edited data of an image including a blackened region that is reduced in data size.

As a result, in FIG. 17, the data processing apparatus 130 can deliver edited data of an image including a blackened region to the mobile terminal 150.

(5) Fifth Application Example

Figure 18:
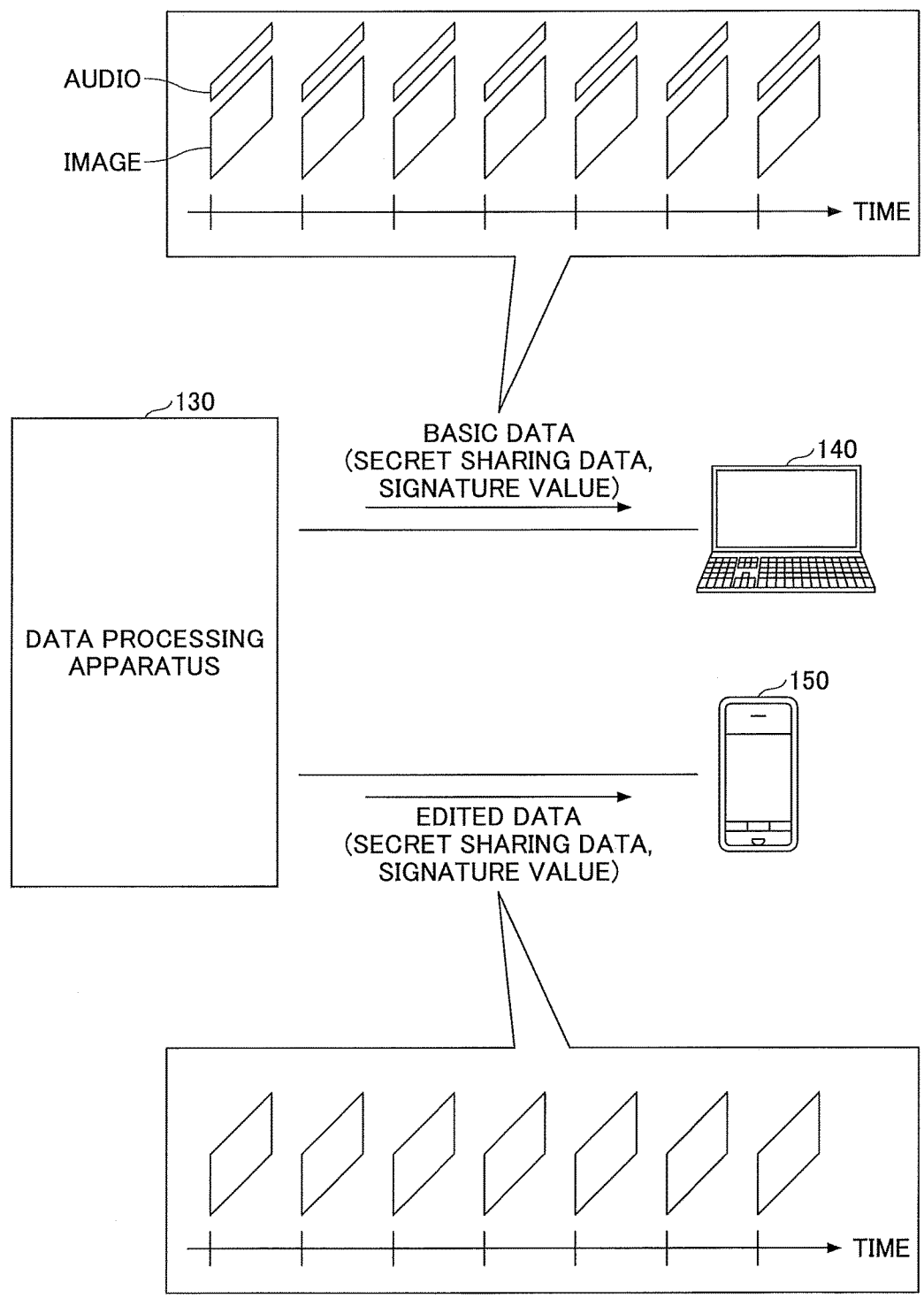
FIG. 18 is a diagram illustrating other examples of data delivered in the data distribution system according to the first embodiment.

FIG. 18 is a diagram illustrating other examples of data delivered in the data distribution system 100. In the example of FIG. 18, the time series data includes moving image data and audio data, and the unit data includes a frame of moving image data and a section of audio data corresponding to the frame.

In FIG. 18, the data processing apparatus 130 delivers basic data to the terminal 140 having high processing capability and delivers edited data to the mobile terminal 150 having low processing capability.

In the case where the unit data includes a frame of the moving image data and a section of audio data corresponding to the frame, the editing unit 812 may delete secret sharing data sets corresponding to the audio data and extract k secret sharing data sets corresponding to the moving image data to generate edited data. In this way, the editing unit 812 can generate edited data including the moving image data with the audio data removed.

As a result, in FIG. 18, the data processing apparatus 130 can deliver edited data including the moving image data with the audio data removed to the mobile terminal 150.

Note that in a case where the unit data includes a frame of the moving image data and audio data of a plurality of ranges of the audio data section corresponding to the frame, the editing unit 812 may delete the secret sharing data corresponding to a predetermined range of the audio data to generate edited data. In this way, the editing unit 812 can generate edited data including the moving image data and the audio data with a high frequency range removed, for example.

As a result, the data processing apparatus 130 can deliver edited data including the moving image data and the audio data with a predetermined range removed to the mobile terminal 150.

(6) Sixth Application Example

Figure 19:
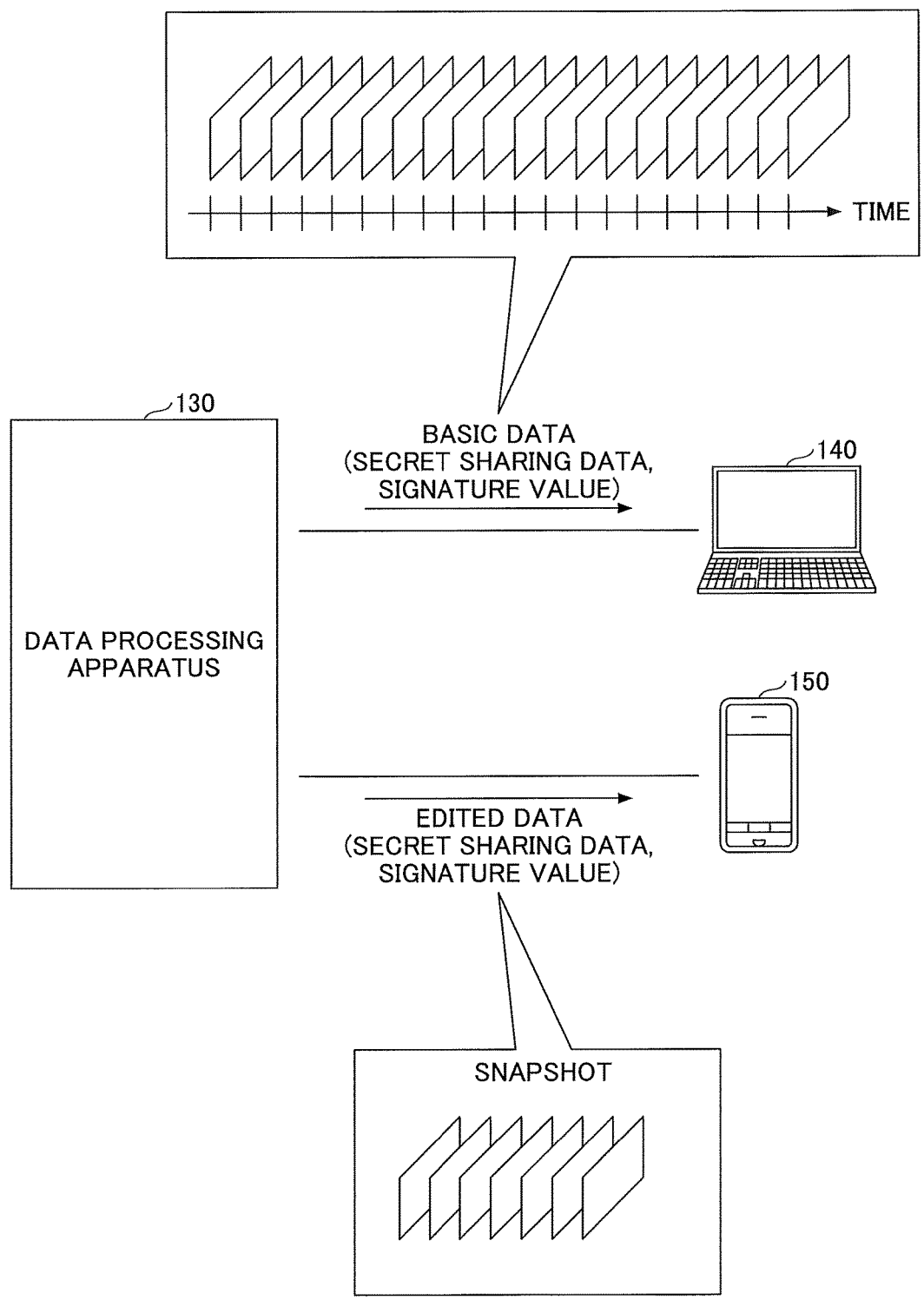
FIG. 19 is a diagram illustrating other examples of data delivered in the data distribution system according to the first embodiment.

FIG. 19 is a diagram illustrating other examples of data delivered in the data distribution system 100. In the example of FIG. 19, the time series data corresponds to moving image data and the unit data corresponds to a frame.

In FIG. 19, the data processing apparatus 130 delivers basic data to the terminal 140 having high processing capability and delivers edited data to the mobile terminal 150 having low processing capability.

In the case where the unit data corresponds to a frame, for each section of signed data, the editing unit 812 deletes one or more secret sharing data sets from n secret sharing data sets that have been generated based on n frames of the moving image data and extracts the remaining k secret data sharing data sets to generate edited data. At this time, the editing unit 812 extracts the k secret data sharing data sets that represent a snapshot image.

In this way, in FIG. 19, the data processing apparatus 130 can deliver a snapshot image to the mobile terminal 150.

10. Summary

As can be appreciated from the above descriptions, the following functional features may be implemented by the data distribution system 100 including the data processing apparatus 130 according to the present embodiment.

The secret sharing data generation unit 132 acquires n sets of unit data from each section of time series data and calculates n sets of parameter information ($W_i$) of a polynomial of degree (k−1) based on the acquired n sets of unit data. Also, the secret sharing data generation unit 132 generates signed data including a combination of the unit data and the corresponding parameter information (secret sharing data), a signature value (S), and a degree number (k) generated by the secret sharing data generating unit 132.

The data storage unit 134 stores the signed data generated by the secret sharing data generation unit 132.

Upon editing the signed data stored in the data storage unit 134, the degree acquiring unit 811 of the delivery unit 133 acquires the degree number (k) included in the signed data.

The editing unit 812 of the delivery unit 133 generates basic data using the n sets of secret sharing data and the signature values included in each section of signed data. Further, the editing unit 812 generates edited data of the signed data by extracting k sets of secret sharing data corresponding to the degree number from the n sets of secret sharing data included in each section of the signed data.

As described above, according to an aspect of the present embodiment, signed data generated using a secret sharing protocol may be edited according to the degree number (k). In this way, the authenticity of data can be ensured even when editing is performed on signed data including a signature.

Also, in the data distribution system 100 including the data processing apparatus 130 according to the present embodiment, the delivery request receiving unit 820 of the delivery unit 133 receives a delivery request and determines the data delivery destination based on the delivery request. The data delivery unit 830 selects either the basic data or the edited data as data to be delivered based on the data delivery destination.

As a result, according to an aspect of the present embodiment, a delivery service according to specific requirements of a delivery destination may be provided even with respect to signed data.

Second Embodiment

According to the first embodiment described above, when the secret sharing data generation units 111 and 132 generate unit data from time series data, the predetermined unit of data corresponding to the unit data is fixed. On the other hand, according to a second embodiment of the present invention, the predetermined unit of data can be changed in response to a delivery request, and the manner of partitioning time series data to generate unit data therefrom can be changed. Note that the following descriptions mainly relate to features of the second embodiment that differ from those of the first embodiment.

<1. Data Generating Apparatus Functional Configuration>

Figure 20:
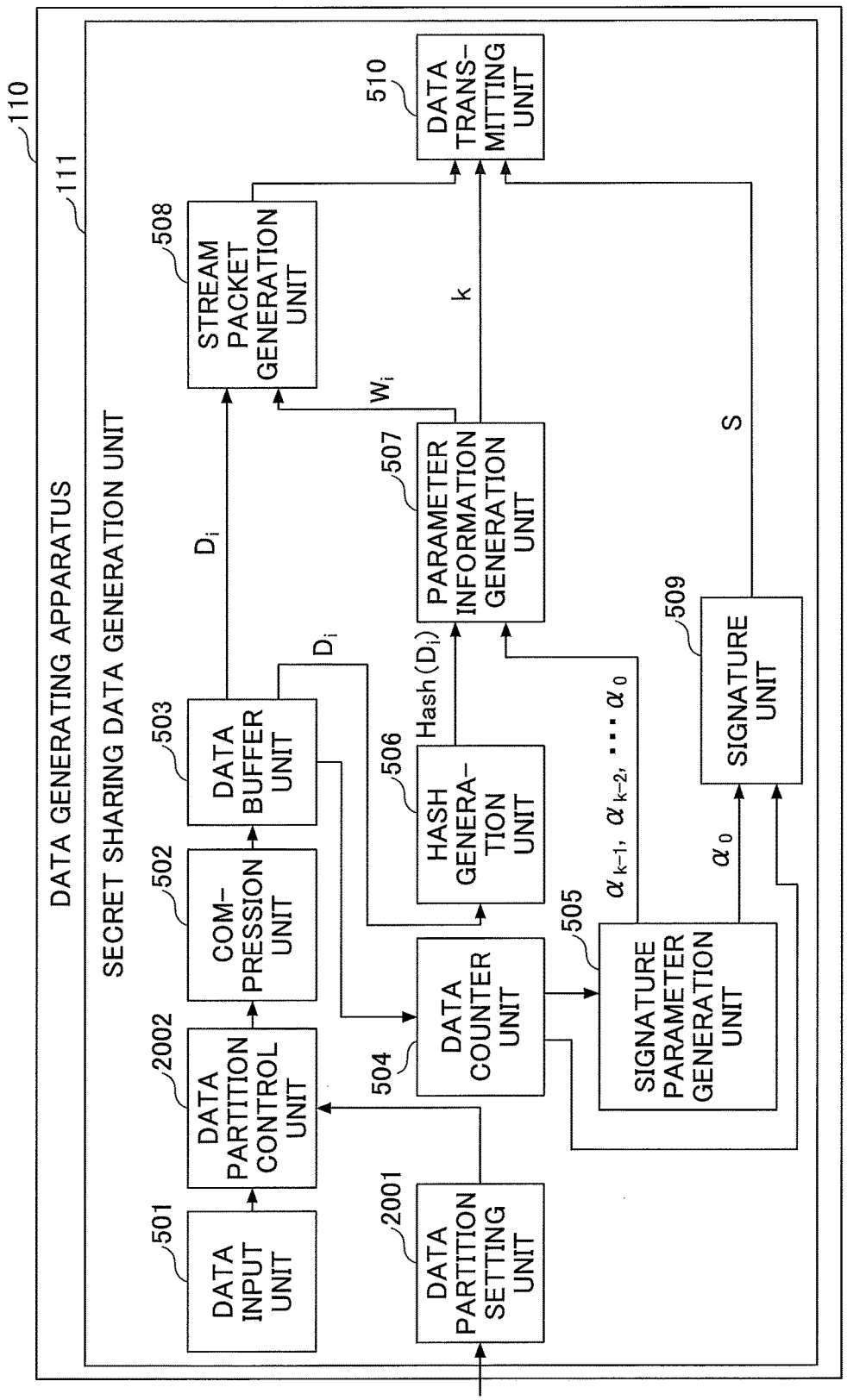
FIG. 20 is a diagram illustrating an example functional configuration of the data generating apparatus according to a second embodiment of the present invention.

In the following, the functional configuration of the secret sharing data generation unit 111 implemented by the data generating apparatus 110 according to the second embodiment is described. FIG. 20 is a diagram illustrating an example functional configuration of the data generating apparatus 110 according to the second embodiment. In FIG. 20, elements that are substantially identical to those illustrated in FIG. 5 are given the same reference numerals. The functional configuration of FIG. 20 differs from that illustrated in FIG. 5 in that it includes a data partition setting unit 2001 and a data partition control unit 2002.

The data partition setting unit 2001 sets up a data partition setting for the data partition control unit 2002 based on an instruction relating to data partitioning transmitted from the data processing apparatus 130. In the present embodiment, example instructions relating to data partitioning transmitted from the data processing apparatus 130 may include the following instructions, for example.

An instruction to partition time series data so that a frame corresponds to unit data;

An instruction to partition time series data so that each of a plurality of regions included in a frame corresponds to unit data; and An instruction to partition time series data so that a frame and an audio data section corresponding to the frame each correspond to unit data.

The data partition control unit 2002 partitions time series data based on the data partition setting set up by the data partition setting unit 2001. The data partition control unit 2002 inputs the partitioned time series data to the compression unit 502. The compression unit 502 compresses the time series data partitioned by the data partition control unit 2002 to generate unit data from the time series data.

<2. Data Processing Apparatus Functional Configuration>

Figure 21:
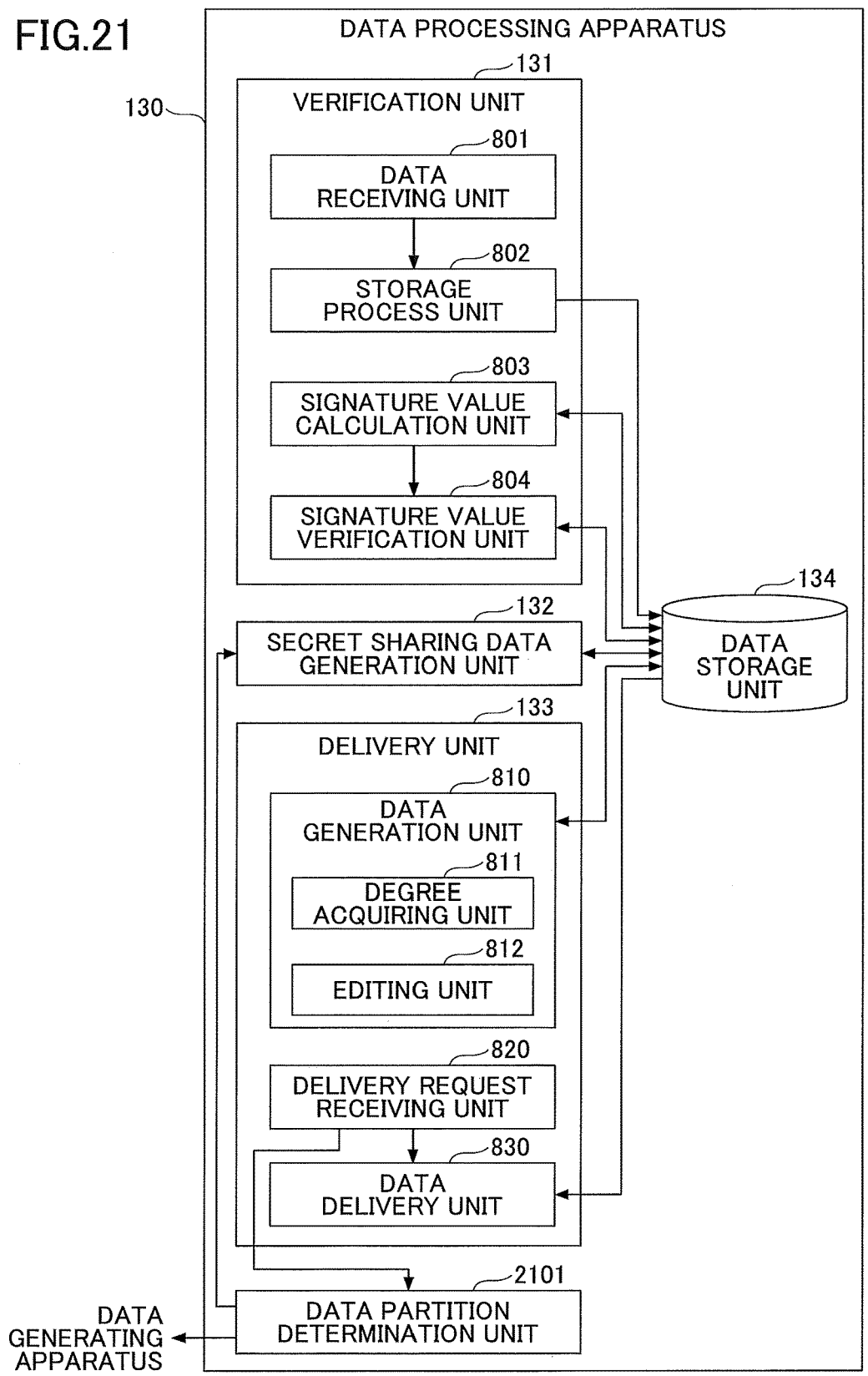
FIG. 21 is a diagram illustrating an example functional configuration of the data processing apparatus according to the second embodiment.

In the following, the functional configuration of the data processing apparatus 130 according to the second embodiment is described. FIG. 21 is a diagram illustrating an example functional configuration of the data processing apparatus 130 according to the second embodiment. In FIG. 21, elements that are substantially identical to those illustrated in FIG. 8 are given the same reference numerals. The functional configuration of FIG. 21 differs from that of FIG. 8 in that it includes a data partition determination unit 2101.

The data partition determination unit 2101 issues an instruction relating to data partitioning to the secret sharing data generation unit 111 or 132 based on a delivery request received by the delivery request receiving unit 820 from the terminal 140 or the mobile terminal 150.

For example, in a case where the source (sender) of the delivery request corresponds to the mobile terminal 150 and the data partition determination unit 2101 decides to deliver data with a low frame rate, the data partition determination unit 2101 may issue an instruction to partition time series data so that a frame corresponds to unit data.

Also, in a case where the data partition determination unit 2101 decides to deliver a digest video, for example, the data partition determination unit 2101 may issue an instruction to partition time series data so that a frame corresponds to unit data.

Also, in a case where the data partition determination unit 2101 receives a delivery request for moving image data in which one image is made up of a plurality of frames, for example, the data partition determination unit 2101 may issue an instruction to partition time series data so that a frame corresponds to unit data.

Further, in a case where the data partition determination unit 2101 receives a delivery request for a snapshot, for example, the data partition determination unit 2101 may issue an instruction to partition time series data so that a frame corresponds to unit data.

On the other hand, in a case where the data partition determination unit 2101 decides to deliver moving image data having a region of a frame partially blackened in order to reduce the communication load, for example, the data partition determination unit 2101 may issue an instruction to partition time series data so that each region of a frame corresponds to unit data.

Further, in a case where the data partition determination unit 2101 decides to delivery only moving image data but not audio data, for example, the data partition determination unit 2101 may issue an instruction to partition time series data such that a frame of the moving image data and the audio data section corresponding to the frame correspond to unit data.

Figure 22:
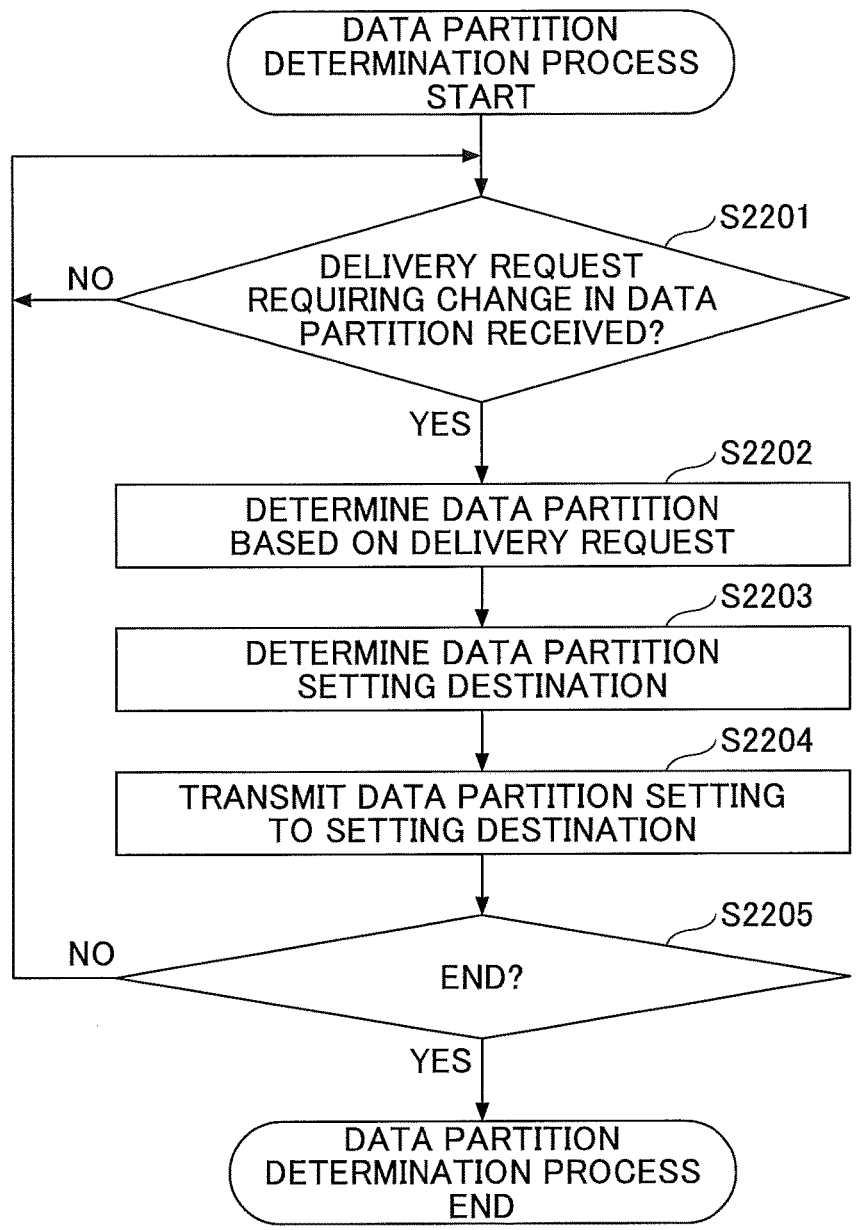
FIG. 22 is a flowchart illustrating an example data partition determination process implemented by a data partition determination unit according to the second embodiment.

FIG. 22 is a flowchart illustrating an example data partition determination process implemented by the data partition determination unit 2101 according to the present embodiment. The process of FIG. 22 may be executed when the data processing apparatus 130 starts a delivery service, for example.

In step S2201, the data partition determination unit 2101 determines whether a delivery request requiring a change in the data partition setting has been received based on the content of the delivery request received by the delivery request receiving unit 820.

If it is determined that a delivery request requiring a change in the data partition setting is not received (NO in step S2201), the data partition determination unit 2101 waits until it receives a delivery request requiring a change in the data partition setting. On the other hand, if a delivery request requiring a change in the data partition setting is received, the data partition determination unit 2101 proceeds to step S2202.

Note that it may be determined that a delivery request requiring change in the data partition setting has been received in a case where the current data partition setting specifies that time series data is to be partitioned into unit data corresponding to a frame, and a delivery request for enabling a region of a frame to be partially blackened is received. Alternatively, in the case where the current data partition setting specifies that time series data is to be partitioned into unit data corresponding to a frame, a delivery request for only moving image data may be received, for example.

In step S2202, the data partition determination unit 2101 determines the data partition setting based on the content of the delivery request.

In step S2203, the data partition determination unit 2101 determines the setting destination of the data partition setting. That is, in a case where target data of the delivery request (data to be delivered) is already stored in the data storage unit 134 of the data processing apparatus 130, the data partition determination unit 2101 determines that the setting destination of the data partition setting corresponds to the secret sharing data generation unit 132 of the data processing apparatus 130. On the other hand, in a case where the target data of the delivery request is not stored in the data storage unit 134 of the data processing apparatus 130, the data partition determination unit 2101 determines that the setting destination of the data partition setting corresponds to the secret sharing data generation unit 111 of the data generating apparatus 110.

In step S2204, the data partition determination unit 2101 transmits information indicating the data partition setting determined in step S2202 to the setting destination determined in step S2203.

In step S2205, the data partition determination unit 2101 determines whether to end the data partition determination process. If the delivery unit 133 continues to provide the delivery service, the data partition determination unit 2101 does not end the data partition determination process and returns to step S2201.

On the other hand, if the delivery unit 133 does not continue providing the delivery service, the data partition determination unit 2101 ends the data partition determination process.

<3. Summary>

As can be appreciated from the above descriptions, in the data distribution system 100 including the data processing apparatus 130 according to the second embodiment, data partitioning for generating unit data from time series data may be changed by changing the predetermined unit of data according to a delivery request.

In this way, according to an aspect of the present embodiment, edited data that is generated using an editing method in accordance with a delivery request can be delivered by the data processing apparatus 130.

Third Embodiment

In the second embodiment described above, a predetermined unit of data that is to correspond to unit data can be changed in response to a delivery request, and as a result, data partitioning for generating unit data from time series data can be changed. According to a third embodiment of the present invention, a predetermined unit of data that is to correspond to unit data can be changed in response to a delivery request, and as a result, data partitioning for generating unit data from time series data can be changed and the data size of the partitioned time series data can be changed. In the following, features of the third embodiment that differ from those of the second embodiment are primarily described.

1. Data Generating Apparatus Functional Configuration

Figure 23:
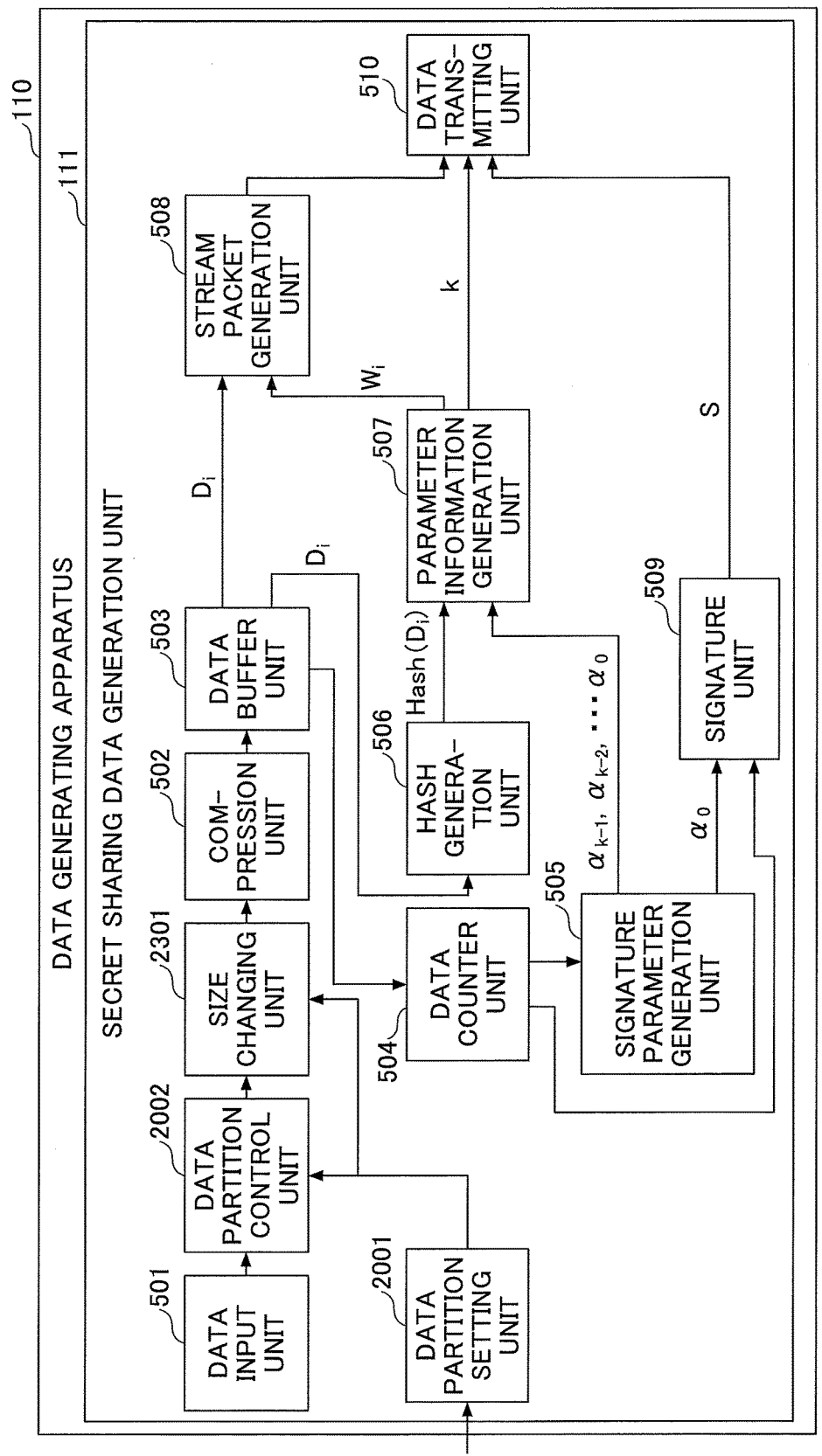
FIG. 23 is a diagram illustrating an example functional configuration of the data generating apparatus according to a third embodiment of the present invention.

In the following, the functional configuration of the secret sharing data generation unit 111 that is implemented by the data generating apparatus 110 according to the third embodiment is described. FIG. 23 is a diagram illustrating an example functional configuration of the data generating apparatus 110 according to the third embodiment. In FIG. 23, elements that are substantially identical to those illustrated in FIG. 20 are given the same reference numerals. The functional configuration of FIG. 23 differs from that illustrated in FIG. 20 in that it includes a size changing unit 2301.

Note that in FIG. 23, the data partition setting unit 2001 receives an instruction relating to a data size in addition to an instruction relating to data partition from the data processing apparatus 130. In turn, the data partition setting unit 2001 sets up a corresponding data partition in the data partition control unit 2002 and a corresponding data size in the size changing unit 2301.

The size changing unit 2301 changes the size of time series data partitioned by the data partition control unit 2002 based on the data size set by the data partition setting unit 2001. The size changing unit 2301 inputs time series data that has been adjusted in size to the compression unit 502. Note that the compression unit 502 compresses the time series data that has been partitioned by the data partition control unit 2002 and has been subjected to size adjustment by the size changing unit 2301 to generate unit data.

2. Data Partition Determination Process by Data Partition Determination Unit

Figure 24:
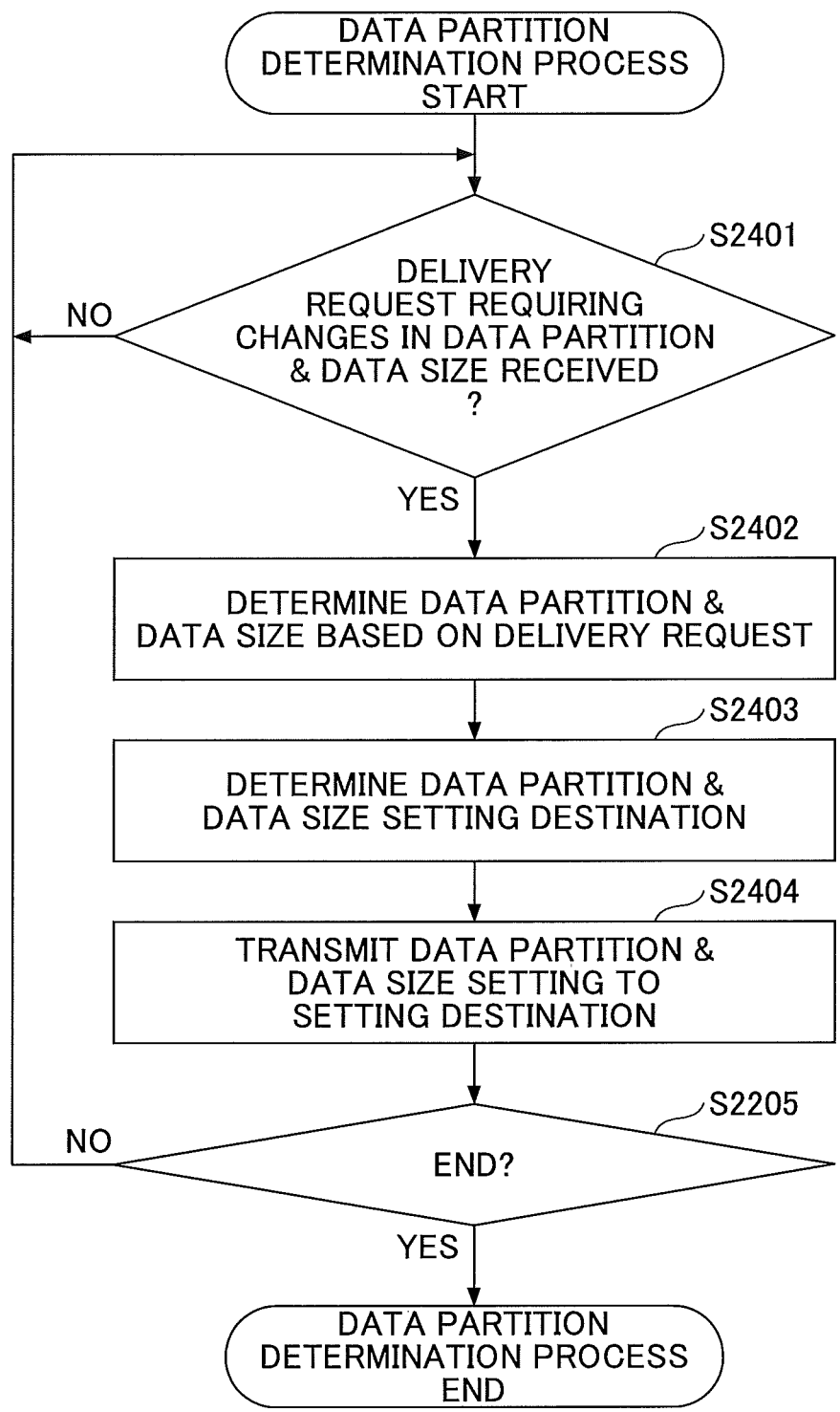
FIG. 24 is a flowchart illustrating another example data partition determination process implemented by the data partition determination unit according to the third embodiment.

In the following, a data partition process implemented by the data partition determination unit 2101 of the data processing apparatus 130 according to the third embodiment is described. FIG. 24 is a flowchart illustrating an example data partition determination process implemented by the data partition determination unit 2101 according to the third embodiment. Note that process operations of the data partition determination process of FIG. 24 that differ from the data partition determination process of FIG. 22 may be found in step S2401 to step S2404.

In step S2401, the data partition determination unit 2101 determines whether a delivery request requiring changes in the data partition setting and the data size setting has been received based on the content of a delivery request received by the delivery request receiving unit 820.

If it is determined that a delivery request requiring changes in the data partition setting and the data size setting has not been received, the data partition determination unit 2101 waits until it receives a delivery request requiring changes in the data partition setting and the data size setting. On the other hand, if it is determined that a delivery request requiring changes in the data partition setting and the data size setting has been received, the data partition determination unit 2101 proceeds to step S2402.

Note that a delivery request requiring changes in the data partition setting and the data size setting refers to a delivery request that requires a change in the data partition setting and further requires a change in the data size because merely changing the data partition setting would not adequately reduce data traffic to a predetermined level such that the data size has to be adjusted, for example.

In step S2402, the data partition determination unit 2101 determines the data partition setting and the data size setting based on the content of the delivery request.

In step S2403, the data partition determination unit 2101 determines the setting destination of the data partition setting. In a case where target data of the delivery request (data to be delivered) is already been stored in the data storage unit 134 of the data processing apparatus 130, the data partition determination unit 2101 determines that the data partition setting and the data size setting are to be set up in the secret sharing data generation unit 132 of the data processing apparatus 130. On the other hand, in a case where the target data of the delivery request is not stored in the data storage unit 134 of the data processing apparatus 130, the data partition determination unit 2101 determines that the data partition setting and the data size setting are to be set up in the secret sharing data generation unit 111 of the data generating apparatus 110.

In step S2204, the data partition determination unit 2101 transmits information indicating the data partition setting and the data size setting determined in step S2202 to the setting destination determined in step S2203.

3. Application Examples

In the following, examples of data delivered in the data distribution system 100 according to the third embodiment are described. Note that the first to sixth application examples described below correspond to the first to sixth application examples of the first embodiment (FIGS. 14 to 19) described above. As such, in the following, features of the first to sixth application examples of the third embodiment that differ from those of the first to sixth application examples of the first embodiment are primarily described.

(1) First Application Example

Figure 25:
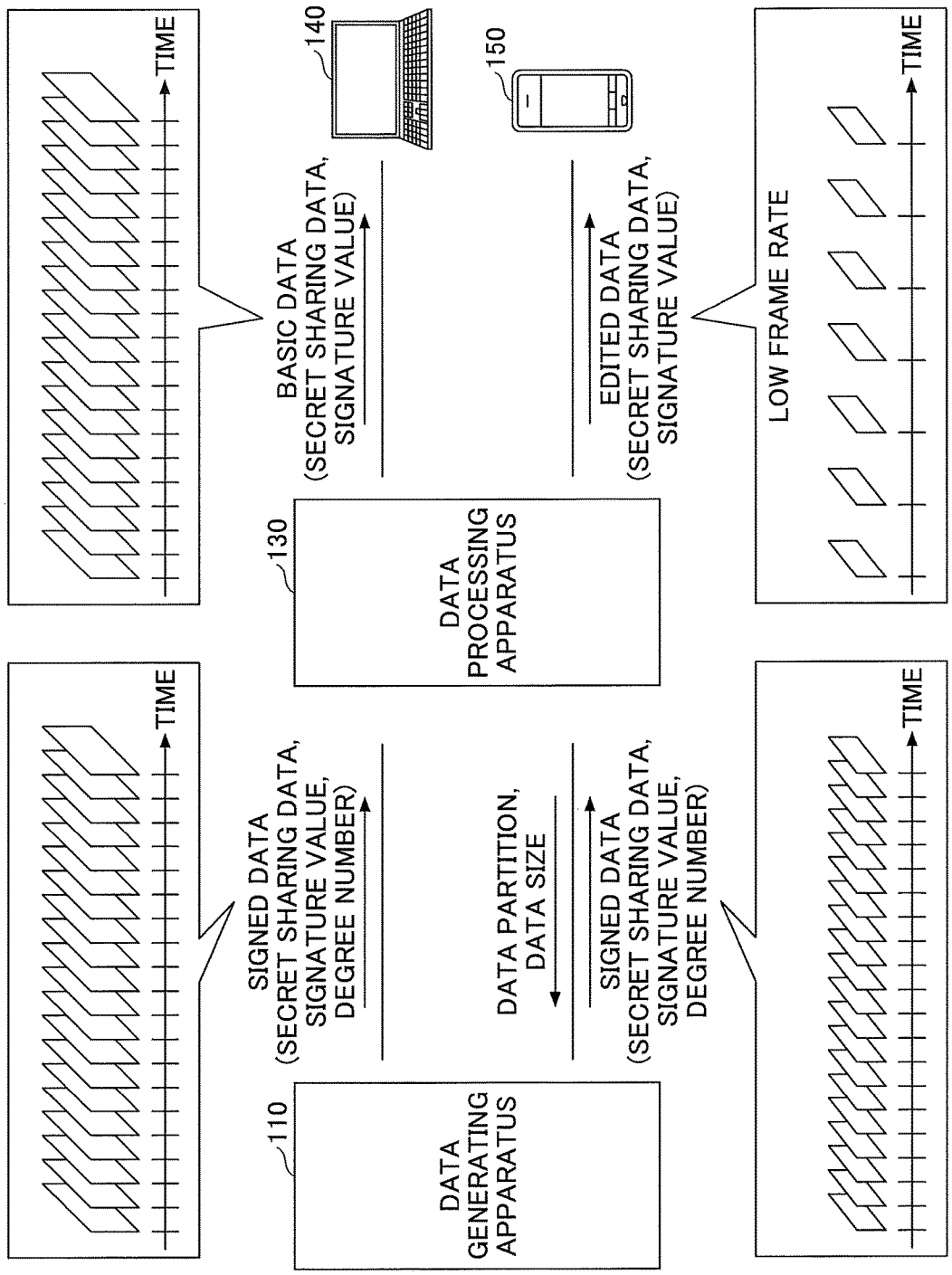
FIG. 25 is a diagram illustrating other examples of data delivered in the data distribution system according to the third embodiment.

FIG. 25 is a diagram illustrating other examples of data delivered in the data distribution system 100 according to the third embodiment. FIG. 25 illustrates an example case where time-series data corresponds to moving image data, a frame is set up as unit data, and an instruction to reduce the data size is received.

In FIG. 25, the data generating apparatus 110 transmits signed data generated based on a frame that is reduced in data size to the data processing device 130. As a result, the data processing apparatus 130 can deliver edited data with a low frame rate with each frame reduced in data size to the mobile terminal 150.

(2) Second Application Example

Figure 26:
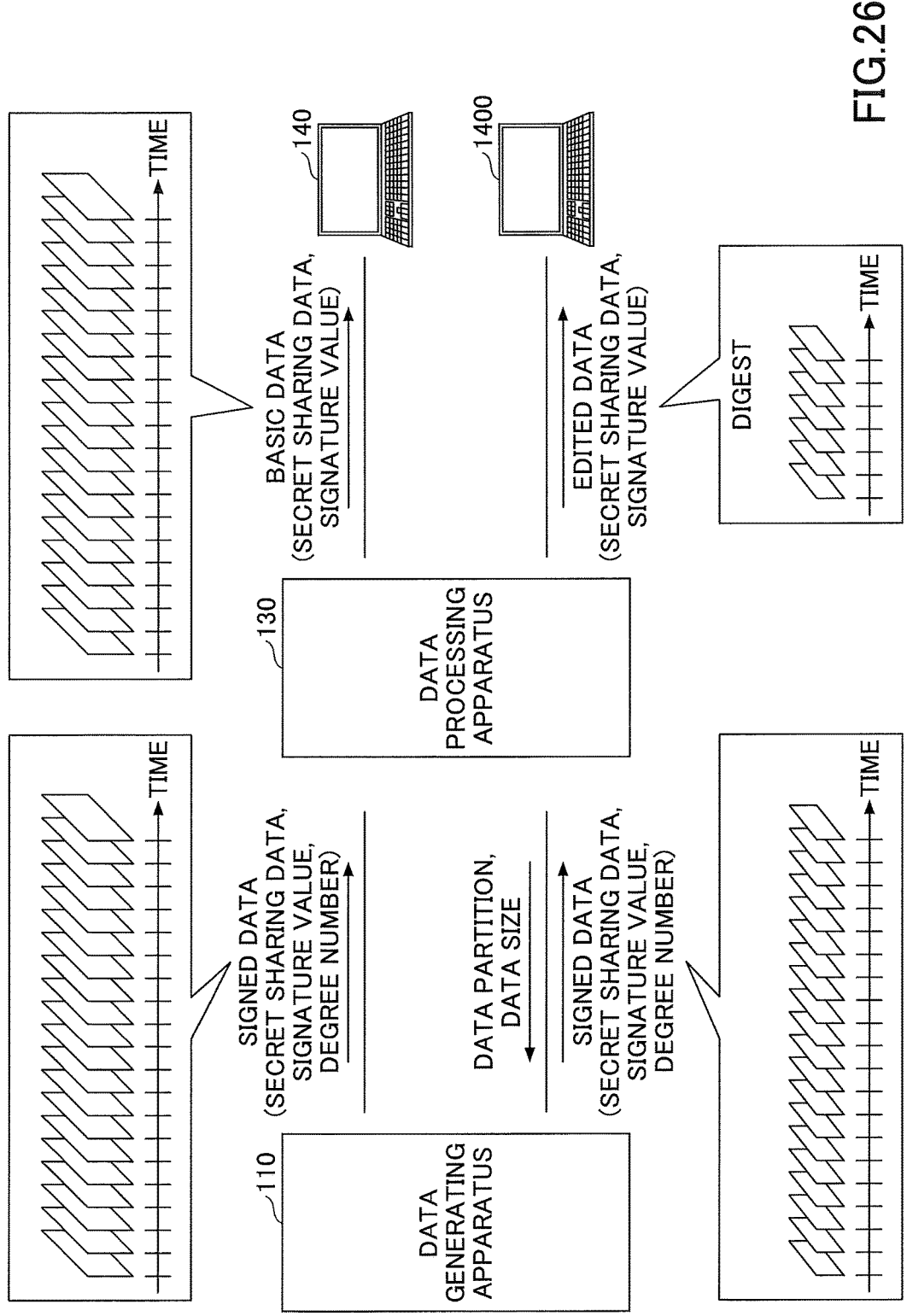
FIG. 26 is a diagram illustrating other examples of data delivered in the data distribution system according to the third embodiment.

FIG. 26 is a diagram illustrating other examples of data delivered in the data distribution system 100 according to the third embodiment. FIG. 26 illustrates an example case where time series data corresponds to moving image data, a frame is set up as unit data, and an instruction to reduce the data size is received.

In FIG. 26, the data generating apparatus 110 transmits signed data generated based on a frame that is reduced in data size to the data processing device 130. As a result, the data processing apparatus 130 can deliver edited data corresponding to a digest video with each frame reduced in data size to the mobile terminal 150.

(3) Third Application Example

Figure 27:
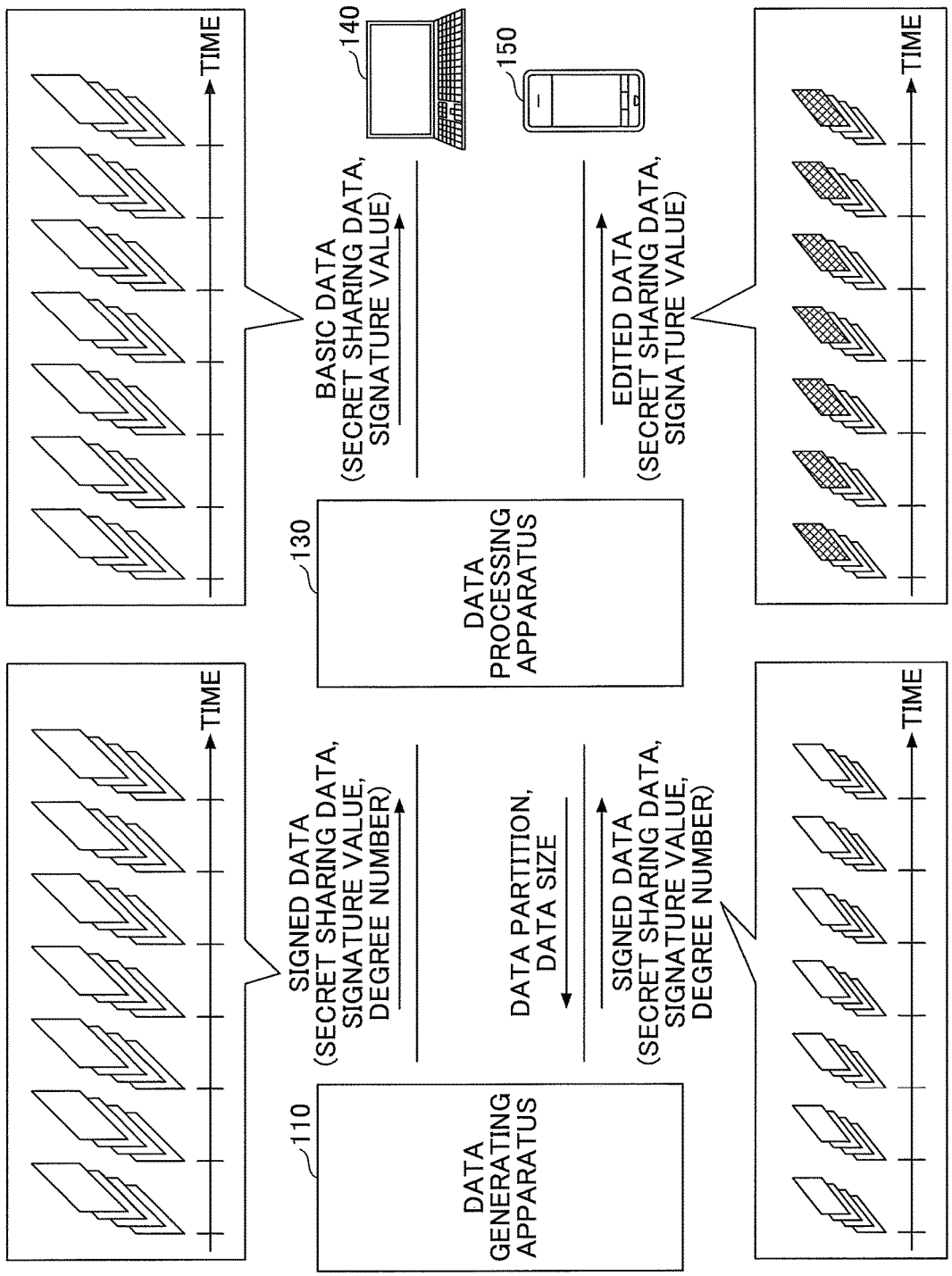
FIG. 27 is a diagram illustrating other examples of data delivered in the data distribution system according to the third embodiment.

FIG. 27 is a diagram illustrating other examples of data delivered in the data distribution system 100 according to the third embodiment. FIG. 27 illustrates an example case where time-series data corresponds to moving image data, a frame is set up as unit data, and an instruction to reduce the data size is received. However, in the example of FIG. 27, one image is made up of a plurality of frames.

In FIG. 27, the data generating apparatus 110 transmits signed data generated based on a frame that is reduced in data size to the data processing apparatus 130. As a result, the data processing apparatus 130 can deliver edited data with a predetermined frame removed and with the remaining frames other than the predetermined frame reduced in data size to the mobile terminal 150.

(4) Fourth Application Example

Figure 28:
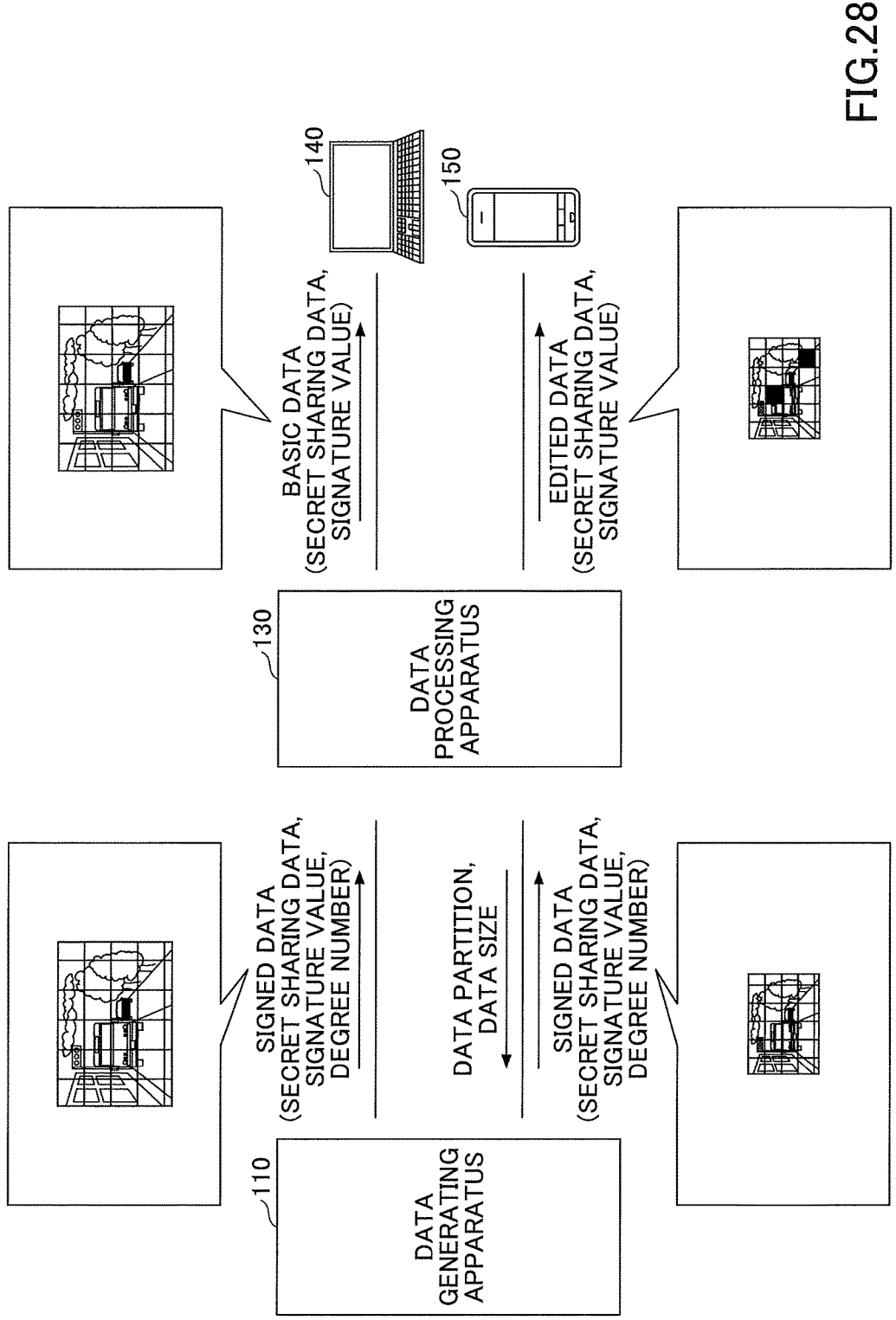
FIG. 28 is a diagram illustrating other examples of data delivered in the data distribution system according to the third embodiment.

FIG. 28 is a diagram showing other examples of data delivered in the data distribution system 100 according to the third embodiment. FIG. 28 illustrates an example case where time series data corresponds to moving image data, a region within one frame is set up as unit data, and an instruction to reduce the data size is received.

In FIG. 28, the data generating apparatus 110 transmits signed data generated based on each region of a frame that is reduced in data size to the data processing apparatus 130. As a result, the data processing apparatus 130 can deliver edited data of a frame that is reduced in data size and including a blackened region to the mobile terminal 150.

(5) Fifth Application Example

Figure 29:
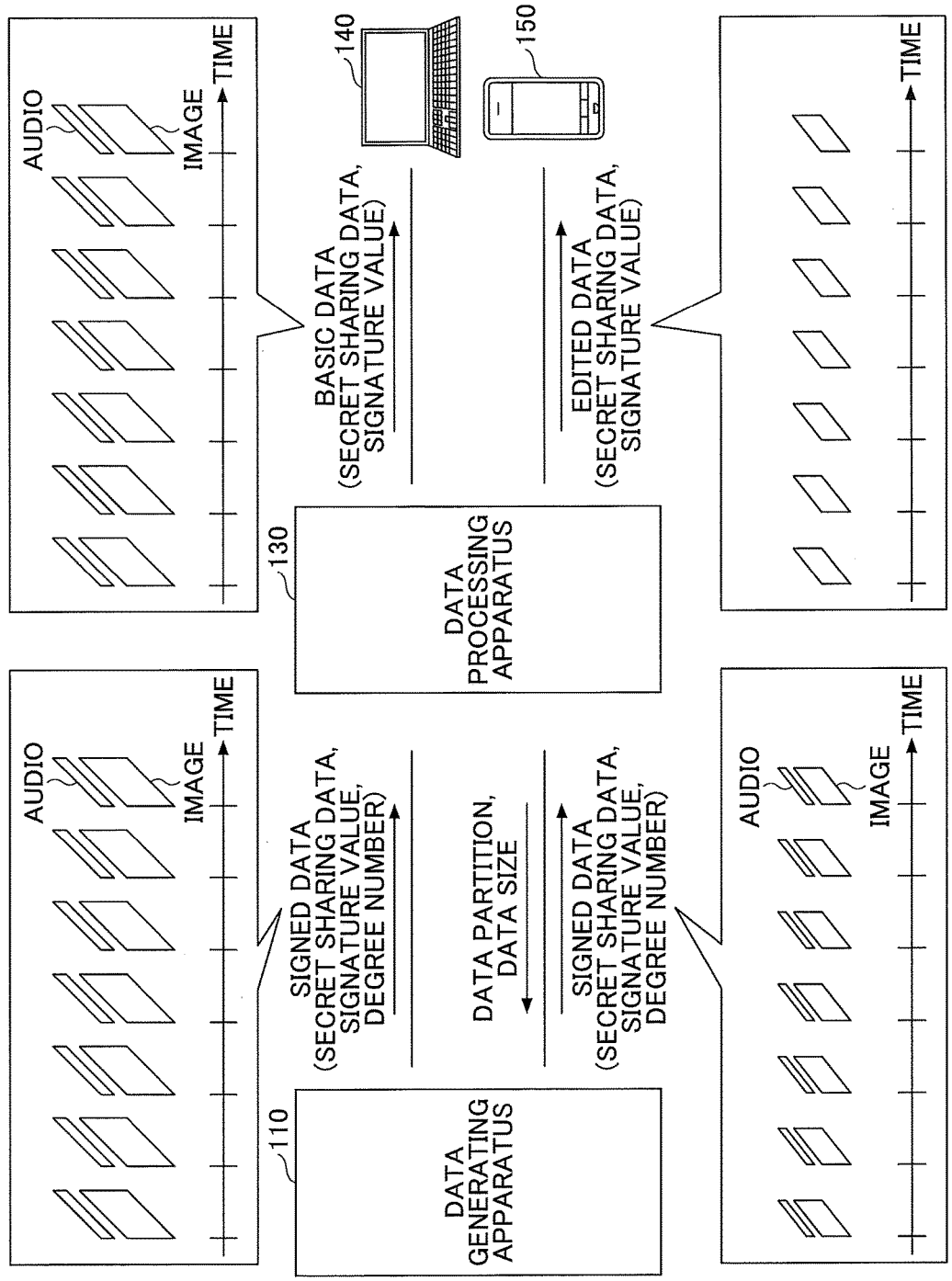
FIG. 29 is a diagram illustrating other examples of data delivered in the data distribution system according to the third embodiment.

FIG. 29 is a diagram illustrating other examples of data delivered in the data distribution system 100 according to the third embodiment. FIG. 29 illustrates an example case where time series data includes moving image data and audio data, a frame of the moving image data and an audio data section corresponding to the frame are set up as unit data, and an instruction to reduce the data size is received.

In FIG. 29, the data generating apparatus 110 transmits signed data generated based on a frame that is reduced in data size and an audio data section reduced in data size and corresponding to the frame to the data processing apparatus 130.

As a result, the data processing apparatus 130 can deliver edited data of a frame that is reduced in data size with the audio data removed to the mobile terminal 150.

(6) Sixth Application Example

Figure 30:
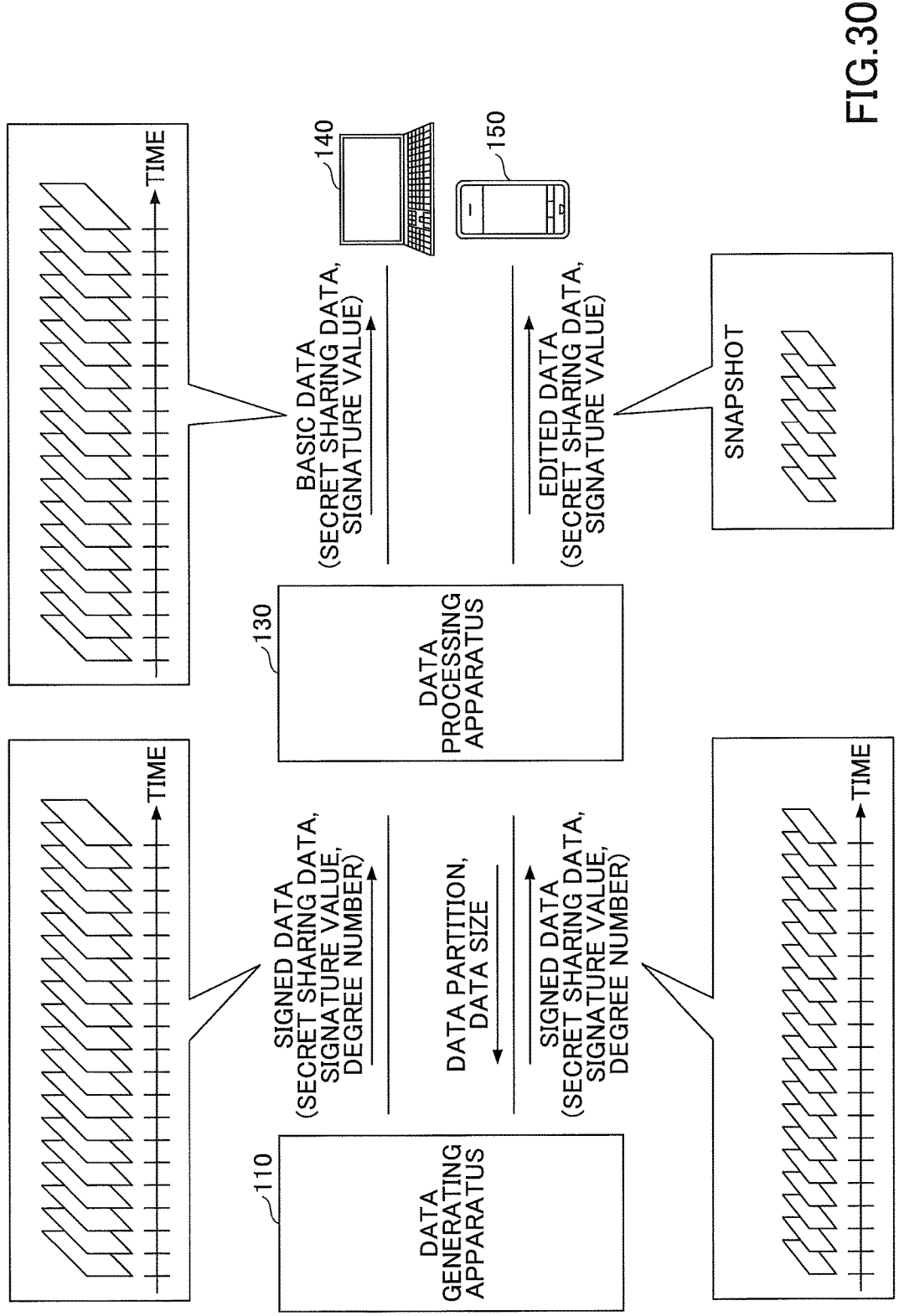
FIG. 30 is a diagram illustrating other examples of data delivered in the data distribution system according to the third embodiment.

FIG. 30 is a diagram illustrating other examples of data delivered in the data distribution system 100 according to the third embodiment. FIG. 30 illustrates an example case where time series data corresponds to moving image data, a frame is set up as unit data, and an instruction to reduce the data size is received.

In FIG. 30, the data generating apparatus 110 transmits signed data generated based on a frame that is reduced in data size to the data processing apparatus 130. As a result, the data processing apparatus 130 can deliver edited data including snapshot images that are reduced in data size to the mobile terminal 150.

4. Summary

As can be appreciated from the above descriptions, in the data distribution system 100 including the data processing apparatus 130 according to the third embodiment, a predetermined unit of data corresponding to unit data may be changed in response to a delivery request, and as a result, data partitioning of time series data and the data size of the partitioned time series data may be changed.

According to an aspect of the present embodiment, edited data with a reduced data size that is generated using an editing method in accordance with a delivery request may be delivered.

Other Embodiments

According to the above-described first embodiment, the data counter unit 504 counts the number of unit data stored and a signature value is calculated with respect to each section of signed data including a predetermined number (n) of unit data ($D_i$). However, the signature value does not necessarily have to be calculated with respect to each data section constituting a predetermined number (n) of unit data ($D_i$). For example, one data section may constitute unit data ($D_i$) of a predetermined time period, and the signature value may be calculated with respect each data section including unit data ($D_i$) of a predetermined time period.

Also, in the first embodiment, the hash generation unit 506 calculates a hash value of the unit data ($D_i$), and the parameter information generation unit 507 generates the parameter information ($W_i$) based on the hash value calculated by the hash generation unit 506. However, the parameter information generation unit 507 may alternatively be configured to directly calculate the parameter information ($W_i$) based on the unit data ($D_i$), for example.

Also, in the first embodiment, the editing unit 812 generates edited data by extracting k sets of secret sharing data, but the number of secret sharing data sets to be extracted is not limited to k. Further, in the first embodiment, the editing unit 812 refers to the regulation information 1300 to generate the edited data, but the editing unit 812 does not have to use the regulation information 1300 to generate edited data. Further, although the regulation information 1300 of FIG. 13 specifies both data to be extracted and data to be deleted, in other examples, regulation information may only specify one of the above.

Also, in the first embodiment, the delivery request receiving unit 820 determines the delivery destination, and the data delivery unit 830 selects either basic data or edited data as data to be delivered depending on the delivery destination. However, when information specifying either basic data or edited data is included in a delivery request, the data delivery unit 830 may select the data to be delivered based on the information included in the delivery request, for example.

Also, in the first embodiment described above, the CPU 402 executes the secret sharing data generation program to implement the secret sharing data generation unit 111. However, the secret sharing data generation unit may also be implemented by a GPU (Graphics Processing Unit), for example.

Also, in the first embodiment described above, the data processing apparatus 130 implements the verification unit 131, the secret sharing data generation unit 132, the delivery unit 133, and the data storage unit 134. However, in other embodiments, the verification unit 131, the secret sharing data generation unit 132, the delivery unit 133, and the data storage unit 134 may be implemented by separate apparatuses, for example. In this case, the functions of the data processing apparatus 130 described above may be implemented by a data processing system including each of these apparatuses, for example.

Although the present invention has been described above with reference to certain illustrative embodiments, the present invention is not limited to these embodiments, and numerous variations and modifications may be made without departing from the scope of the present invention.

What is claimed is:

1. A data processing system comprising:
a memory storing a program; and
a processor configured to execute the program to implement processes of
reading signed data including a predetermined number n (where n is an integer greater than or equal to 2) of secret sharing data sets generated for each section of time series data and a signature value calculated for the each section of time series data based on a secret sharing protocol, the n secret sharing data sets including n units of data acquired from the each section of time series data and parameter information for a polynomial of a predetermined degree calculated based on the acquired n units of data;
acquiring the predetermined degree; and
editing the signed data by extracting a specific number of the secret sharing data sets from the n secret sharing data sets for the each section of time series data, the specific number being specified by the acquired predetermined degree,
wherein the processor further implements a process of determining a data partition to be applied upon acquiring the n units of data from the each section of time series data, and
wherein the processor further implements a process of generating the signed data for the each section of time series data by acquiring the n units of data from the each section of time series data based on the determined data partition and calculating the parameter information for the polynomial of the predetermined degree based on the acquired n units of data to generate the n secret sharing data sets, and associating the signature value calculated for the each section of time series data with the n secret sharing data sets.

2. A data processing apparatus comprising:
a memory storing a program; and
a processor configured to execute the program to implement processes of
reading signed data including a predetermined number n (where n is an integer greater than or equal to 2) of secret sharing data sets generated for each section of time series data and a signature value calculated for the each section of time series data based on a secret sharing protocol, the n secret sharing data sets including n units of data acquired from the each section of time series data and parameter information for a polynomial of a predetermined degree calculated based on the acquired n units of data;
acquiring the predetermined degree; and
editing the signed data by extracting a specific number of the secret sharing data sets from the n secret sharing data sets for the each section of time series data, the specific number being specified by the acquired predetermined degree,
wherein the processor further implements a process of determining a data partition to be applied upon acquiring the n units of data from the each section of time series data, and
wherein the processor further implements a process of generating the signed data for the each section of time series data by acquiring the n units of data from the each section of time series data based on the determined data partition and calculating the parameter information for the polynomial of the predetermined degree based on the acquired n units of data to generate the n secret sharing data sets, and associating the signature value calculated for the each section of time series data with the n secret sharing data sets.

3. The data processing apparatus according to claim 2, wherein
the signature value is calculated by adding a signature to secret information based on the secret sharing protocol, the secret information being calculated based on the specific number of secret sharing data sets extracted according to the predetermined degree.

4. The data processing apparatus according to claim 2, wherein
the processor extracts the specific number of the secret sharing data sets according to the predetermined degree based on regulation information defining the secret sharing data sets to be extracted for the each section of time series data.

5. The data processing apparatus according to claim 2, wherein
the memory stores first data including the n secret sharing data sets for the each section of time series data and second data including the specific number of secret sharing data sets extracted according to the predetermined degree for the each section of time series data; and
the processor further implements a process of selecting and delivering either the first data or the second data to a delivery destination in response to a delivery request.

6. The data processing apparatus according to claim 2, wherein the processor further implements processes of
determining a data size of the n units of data to be acquired from the each section of time series data; and
generating the signed data for the each section of time series data by acquiring the n units of data from the each section of time series data based on the determined data partition and the determined data size and calculating the parameter information for the polynomial of the predetermined degree based on the acquired n units of data to generate the n secret sharing data sets, and associating the signature value calculated for the each section of time series data with the n secret sharing data sets.

7. A data processing method comprising steps of:

reading signed data including a predetermined number n (where n is an integer greater than or equal to 2) of secret sharing data sets generated for each section of time series data and a signature value calculated for the each section of time series data based on a secret sharing protocol, the n secret sharing data sets including n units of data acquired from the each section of time series data and parameter information for a polynomial of a predetermined degree calculated based on the acquired n units of data;

acquiring the predetermined degree; and editing the signed data by extracting a specific number of the secret sharing data sets from the n secret sharing data sets for the each section of time series data, the specific number being specified by the acquired predetermined degree, wherein the method further comprises steps of:

determining a data partition to be applied upon acquiring the n units of data from the each section of time series data, and generating the signed data for the each section of time series data by acquiring the n units of data from the each section of time series data based on the determined data partition and calculating the parameter information for the polynomial of the predetermined degree based on the acquired n units of data to generate the n secret sharing data sets, and associating the signature value calculated for the each section of time series data with the n secret sharing data sets.

* * * * *